US 12,063,677 B2

(12) United States Patent
Elshafie et al.

(10) Patent No.: US 12,063,677 B2
(45) Date of Patent: Aug. 13, 2024

(54) CHANNEL AND INTERFERENCE MEASUREMENT USING SEMI-PERSISTENT SCHEDULED RESOURCES IN WIRELESS COMMUNICATION

(71) Applicant: QUALCOMM Incorporated, San Diego, CA (US)

(72) Inventors: Ahmed Elshafie, San Diego, CA (US); Yi Huang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 17/504,463

(22) Filed: Oct. 18, 2021

(65) Prior Publication Data
US 2022/0124741 A1 Apr. 21, 2022

Related U.S. Application Data

(60) Provisional application No. 63/093,742, filed on Oct. 19, 2020, provisional application No. 63/093,760, filed on Oct. 19, 2020.

(51) Int. Cl.
*H04W 72/542* (2023.01)
*H04L 1/1812* (2023.01)
(Continued)

(52) U.S. Cl.
CPC ......... *H04W 72/542* (2023.01); *H04L 1/1819* (2013.01); *H04L 5/0051* (2013.01);
(Continued)

(58) Field of Classification Search
CPC ............... H04W 72/542; H04W 72/23; H04W 72/1268; H04L 1/1819; H04L 5/0051; H04L 5/0053
(Continued)

(56) References Cited

U.S. PATENT DOCUMENTS

| 2019/0116608 A1* | 4/2019 | Kim .................. H04W 72/1263 |
| 2019/0150123 A1* | 5/2019 | Nogami ................ H04W 72/23 370/330 |
| 2019/0261354 A1 | 8/2019 | Fakoorian et al. |

FOREIGN PATENT DOCUMENTS

| WO | 2021159465 A1 | 8/2021 |
| WO | 2021163162 A1 | 8/2021 |

OTHER PUBLICATIONS

CAICT: "Discussion on DL SPS Enhancements", 3GPP Draft, R1-1913034, 3GPP TSG RAN WG1 Meeting #99, 3rd Generation Partnership Project (3GPP), Mobile Competence Centre, 650, Route Des Lucioles, F-06921 Sophia-Antipolis Cedex, France, vol. RAN WG1, no. Reno, USA, Nov. 18, 2019-Nov. 22, 2019, Nov. 8, 2019 (Nov. 8, 2019), XP051820279l, 6 Pages, Retrieved from the Internet: URL: https://ftp.3gpp.org/tsg_ran/WG1_RL1/TSGR1_99/Docs/R1-1913034.zip R1-1913034.docx [retrieved on Nov. 8, 2019] Section 1, 2. 1, 2 .4.
(Continued)

*Primary Examiner* — Peter G Solinsky
(74) *Attorney, Agent, or Firm* — Loza & Loza, LLP

(57) ABSTRACT

A scheduling entity can configure semi-persistent scheduling (SPS) resources for downlink data and selectively receiving channel measurements and interference measurements from a user equipment. The scheduling entity can trigger the channel measurements and interference measurements using various methods including SPS configuration activation/reactivation/deactivation, DMRS based triggering, and DCI based triggering. The scheduling entity can benefit from more frequent and/or aperiodic interference and/or channel measurements in performing channel precoding, selecting a modulation and coding scheme (MCS), and estimating/predicting interference, noise, and channel quality at the UE. SPS configured channel and interference
(Continued)

measurements also benefit the UE in data decoding that can result in a lower error ratio and higher data rate.

30 Claims, 22 Drawing Sheets

(51) Int. Cl.
 *H04L 5/00* (2006.01)
 *H04W 72/1268* (2023.01)
 *H04W 72/23* (2023.01)
(52) U.S. Cl.
 CPC ....... *H04L 5/0053* (2013.01); *H04W 72/1268* (2013.01); *H04W 72/23* (2023.01)
(58) Field of Classification Search
 USPC ......................................................... 370/329
 See application file for complete search history.

(56) References Cited

OTHER PUBLICATIONS

CAICT: "Remaining Issues on DL SPS Enhancements for Nr URLLC", 3GPP Draft, R1-2001065, 3GPP TSG RAN WG1 Meeting #100-e, 3rd Generation Partnership Project (3GPP), Mobile Competence Centre, 650, Route Des Lucioles, F-06921 Sophia-Antipolis Cedex, France, vol. RAN WG1 , no. e-Meeting, Feb. 24, 2020-Mar. 6, 2020, Feb. 14, 2020 (Feb. 14, 2020), XP051853152, 5 Pages, Retrieved from the Internet : URL: https://ftp.3gpp.org/tsg_ran/WG1_RL1/TSGR1_100_e/Docs/R1-2001065.zip R1-2001065. docx [retrieved on Feb. 14, 2020] the whole document.
International Search Report and Written Opinion—PCT/US2021/055613—ISA/EPO—Feb. 28, 2022.

\* cited by examiner

CHANNEL AND INTERFERENCE MEASUREMENT USING SEMI-PERSISTENT SCHEDULED RESOURCES IN WIRELESS COMMUNICATION

PRIORITY CLAIM

This application claims priority to and the benefit of provisional patent application No. 63/093,742 filed in the United States Patent Office on Oct. 19, 2020 and provisional patent application No. 63/093,760 filed in the United States Patent Office on Oct. 19, 2020, the entire content of each application is incorporated herein by reference as if fully set forth below in its entirety and for all applicable purposes.

TECHNICAL FIELD

The technology discussed below relates generally to wireless communication systems, and more particularly, to interference and channel measurements using semi-persistent scheduling (SPS) resources in a wireless communication system.

INTRODUCTION

In a wireless communication system, a base station can schedule communication resources for user equipment (UE) using dynamic scheduling or semi-persistent scheduling. Dynamic scheduling is a mechanism in which the base station schedules the downlink resources (e.g., physical downlink shared channel (PDSCH)) and/or uplink resources (e.g., physical uplink shared channel (PUSCH)) in each subframe or slot, for example, using downlink control information (DCI). Dynamic scheduling provides the network with flexibility in assigning communication resources to the UE at the cost of increased control signaling overhead to transmit scheduling information for each uplink and/or downlink transmission.

To reduce communication overhead, the base station can allocate communication resources on a semi-persistent basis. Semi-persistent scheduling (SPS) based resource allocation can allocate periodic resources to the UE semi-statically over a certain time interval (e.g., one or more slots). In SPS, the base station can schedule an uplink/downlink resources using a semi-static control message (e.g., radio resource control (RRC) message). Using SPS can significantly reduce control signaling overhead because the base station does not need to transmit scheduling information (e.g., grant) for each uplink or downlink communication. In this disclosure, SPS and configured scheduling may be used interchangeably.

SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Aspects of the present disclosure provide a method, system, device, and apparatus for efficient interference and channel measurement using semi-persistent scheduling (SPS) resources. A scheduling entity can allocate uplink communication resources to a user equipment (UE) for channel measurements and interference measurements and report the measurements using SPS uplink resources. In some aspects, the scheduling entity can transmit a reference signal or downlink control information to trigger the UE to measure the channel and/or interference in one or more SPS occasions. The scheduling entity can benefit from the interference and channel measurements in performing channel precoding, selecting a modulation and coding scheme (MCS), and estimating/predicting interference, noise, and channel quality at the UE. Channel and interference measurements also benefit the UE in data decoding that can result in a lower error rate and higher data rate.

One aspect of the disclosure provides a scheduling entity for wireless communication. The scheduling entity includes a communication interface configured to communicate with a user equipment (UE); a memory; and a processor coupled with the communication interface and the memory. The processor and the memory are configured to: transmit, to the UE, semi-persistent scheduling (SPS) information of wireless resources usable for transmitting downlink data; transmit, to the UE, a channel measurement resource configuration for measuring a communication channel between the UE and the scheduling entity, and a physical uplink control channel (PUCCH) resource configuration for reporting channel measurements of the communication channel and a physical downlink shared channel (PDSCH) feedback associated with at least one SPS configuration according to the SPS information; and receive, from the UE, a report comprising the channel measurements according to the at least one SPS configuration, wherein the channel measurements comprises at least one of channel state information, channel characteristics, or interference measurements of the communication channel.

One aspect of the disclosure provides a method of wireless communication at a scheduling entity. The method includes: transmitting, to a user equipment (UE), semi-persistent scheduling (SPS) information of wireless resources usable for transmitting downlink data; transmitting, to the UE, a channel measurement resource configuration for measuring a communication channel between the UE and the scheduling entity, and a physical uplink control channel (PUCCH) resource configuration for reporting channel measurements and a physical downlink shared channel (PDSCH) feedback associated with the at least one SPS configuration according to the SPS information; and receiving, from the UE, a report comprising the channel measurements according to the at least one SPS configuration, wherein the channel measurements comprises at least one of channel state information, channel characteristics or interference measurements of the communication channel.

One aspect of the disclosure provides a user equipment (UE) for wireless communication. The UE includes: a communication interface configured to communicate with a scheduling entity; a memory; and a processor coupled with the communication interface and the memory. The processor and the memory are configured to: receive, from a scheduling entity, semi-persistent scheduling (SPS) information of wireless resources usable for receiving downlink data; receive, from the scheduling entity, a channel measurement resource configuration for measuring a communication channel between the UE and the scheduling entity, and a physical uplink control channel (PUCCH) resource configuration for reporting channel measurements of the communication channel and a physical downlink shared channel (PDSCH) feedback associated with the at least one SPS configuration according to the SPS information; and transmit, to the scheduling entity, a report comprising the channel measurements according to the at least one SPS configuration, wherein the channel measurements comprise at least one of channel state information, channel characteristics, or interference measurements of the communication channel.

One aspect of the disclosure provides a method of wireless communication at a user equipment (UE). The method includes: receiving, from a scheduling entity, semi-persistent scheduling (SPS) information of wireless resources usable for receiving downlink data; receiving, from the scheduling entity, a channel measurement resource configuration for measuring a communication channel between the UE and the scheduling entity, and a physical uplink control channel (PUCCH) resource configuration for reporting channel measurements and a physical downlink shared channel (PDSCH) feedback associated with the at least one SPS configuration according to the SPS information; and transmitting, to the scheduling entity, a report comprising the channel measurements according to the at least one channel state information, SPS configuration, wherein the channel measurements comprise at least one of channel characteristics or interference measurements of the communication channel.

These and other aspects of the invention will become more fully understood upon a review of the detailed description, which follows. Other aspects, features, and implementations will become apparent to those of ordinary skill in the art, upon reviewing the following description of specific, exemplary implementations in conjunction with the accompanying figures. While features may be discussed relative to certain implementations and figures below, all implementations can include one or more of the advantageous features discussed herein. In other words, while one or more implementations may be discussed as having certain advantageous features, one or more of such features may also be used in accordance with the various implementations discussed herein. In similar fashion, while exemplary implementations may be discussed below as devices, systems, or methods, it should be understood that such examples can be implemented in various devices, systems, and methods.

DETAILED DESCRIPTION

Figure 1:
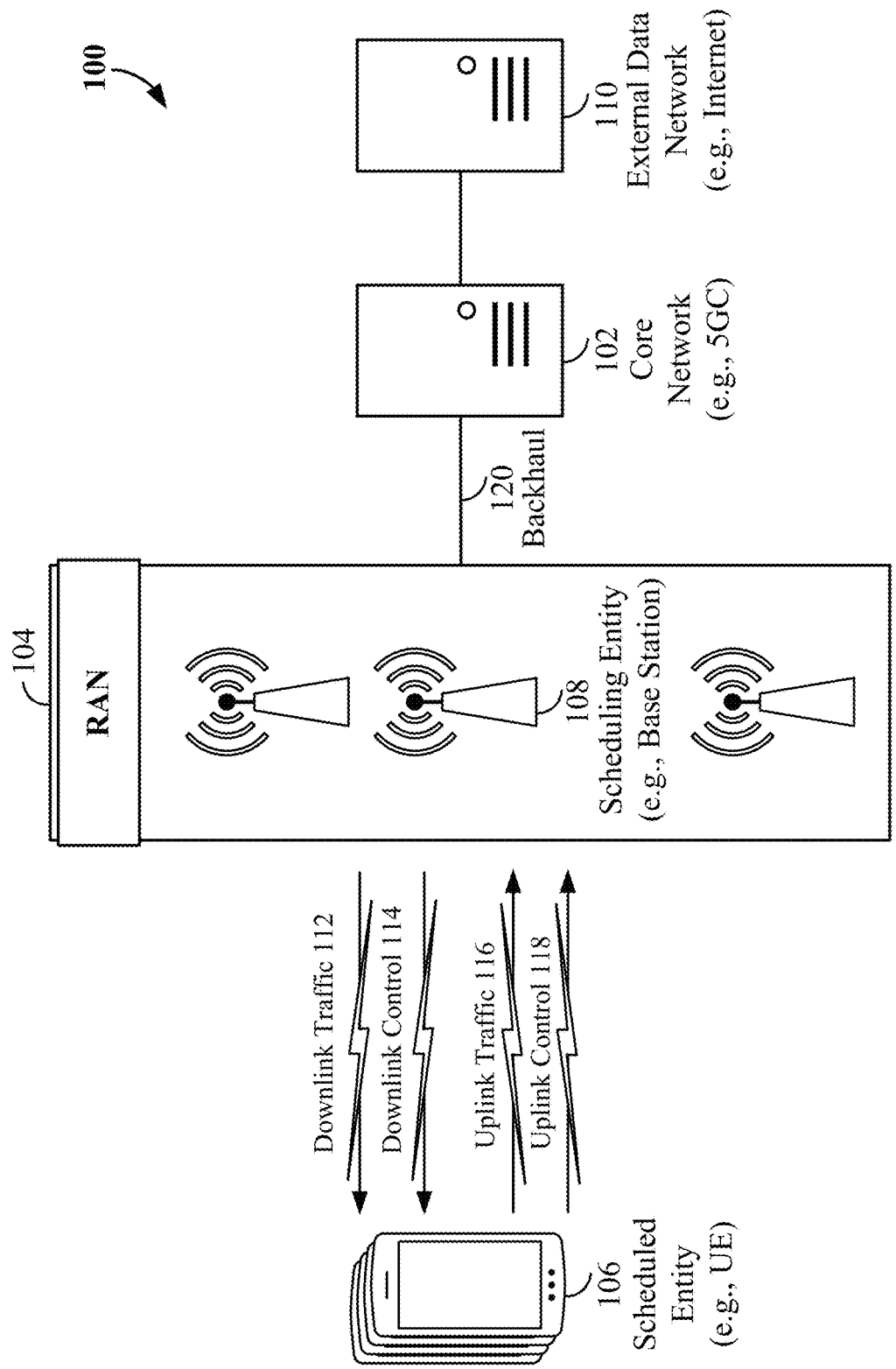
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chips and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Aspects of the present disclosure provide a method, system, device, and apparatus for efficient interference and channel measurement of a communication channel between a scheduling entity (e.g., base station) and a user equipment (UE) using semi-persistent scheduling (SPS) resources. The scheduling entity can use SPS configurations to allocate periodic wireless resources to a UE for channel measurements and interference measurements that can be triggered by a downlink reference signal or downlink control information (DCI). The scheduling entity and UE may communicate via a channel that may include, for example, control channels (e.g., a physical downlink control channel (PDCCH) and a physical uplink control channel (PUCCH)), and data channels (e.g., a physical downlink shared channel (PDSCH) and a physical uplink shared channel (PUSCH)). The scheduling entity can benefit from more frequent interference and channel measurements in performing channel precoding, selecting a modulation and coding scheme (MCS), and estimating/predicting interference, noise, and channel quality at the UE. Channel and interference measurements using SPS resources also can benefit the UE in data decoding that can result in a lower error rate and higher data rate. According to some aspects, in order to obtain channel condition information more quickly than may be provided by a scheduled channel report via an uplink data channel, a scheduling entity can transmit DCI or a reference signal to trigger the UE to send channel and/or interference reports using SPS resources.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller;

agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108. The scheduled entity 106 can transmit uplink control information 118 to the network (e.g., scheduling entity 108).

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
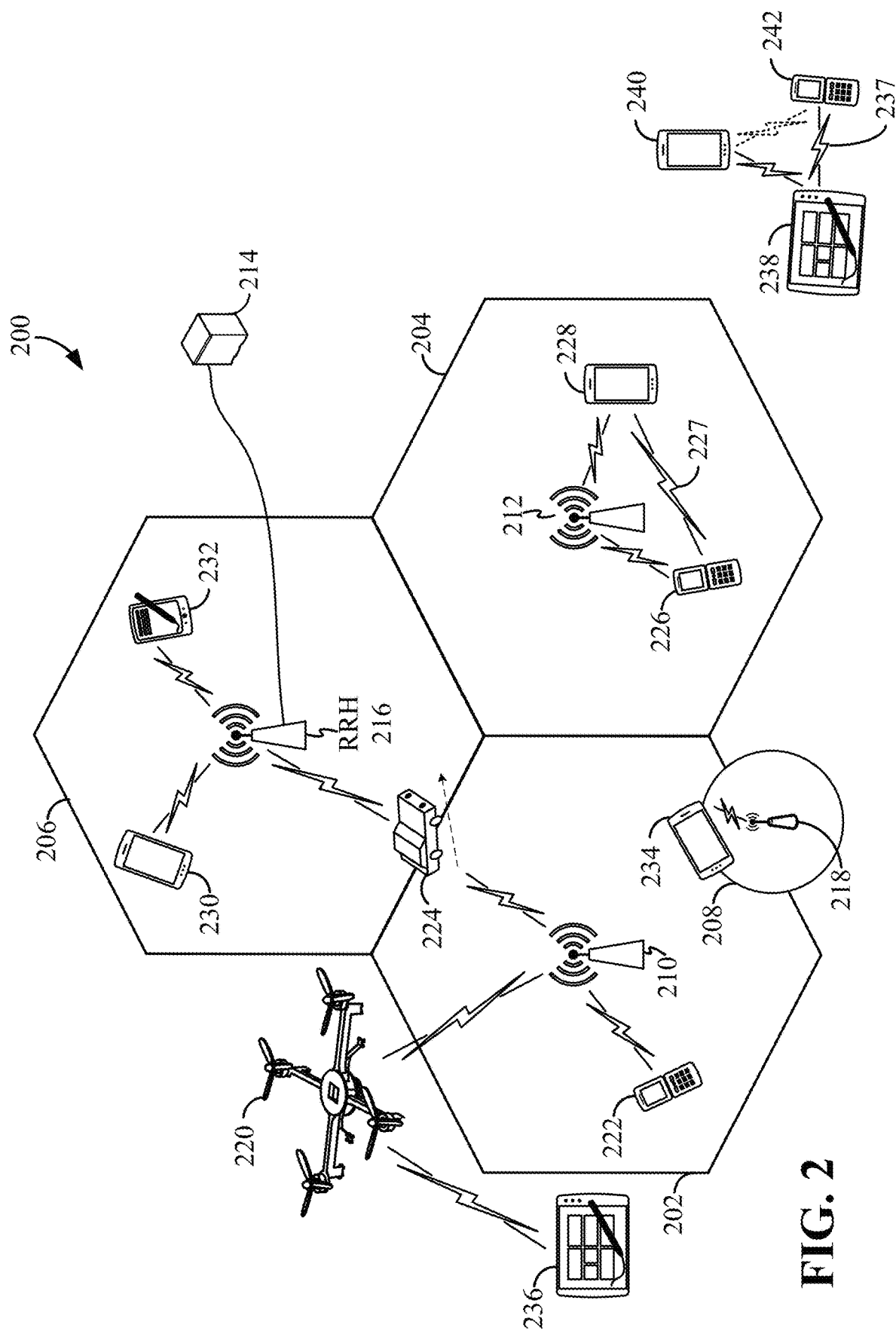
FIG. 2 is an illustration of an example of a radio access network according to some aspects.

FIG. 2 is an illustration of a radio access network (RAN) 200 according to some aspects. In some examples, the RAN 200 may be the same as the RAN 104 described above and illustrated in FIG. 1. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes an unmanned aerial vehicle (UAV) 220, which may be a quadcopter or drone. The UAV 220 may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, the UAV 220 (e.g., quadcopter) may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 238, 240, and 242) may communicate with each other using peer-to-peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) and a security anchor function (SEAF) that perform authentication. The SCMF can manage, in whole or in part, the security context for both the control plane and the user plane functionality.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may hand over the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times, the channel is dedicated for transmissions in one direction, while at other times, the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Further, the air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms as well as other waveforms.

Within the present disclosure, a frame refers to a duration of 10 ms for wireless transmissions, with each frame including 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple numbers of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each subframe 302 (e.g., a 1 ms subframe) may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., physical downlink control channel (PDCCH)), and the data region 314 may carry data channels (e.g., PDCCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
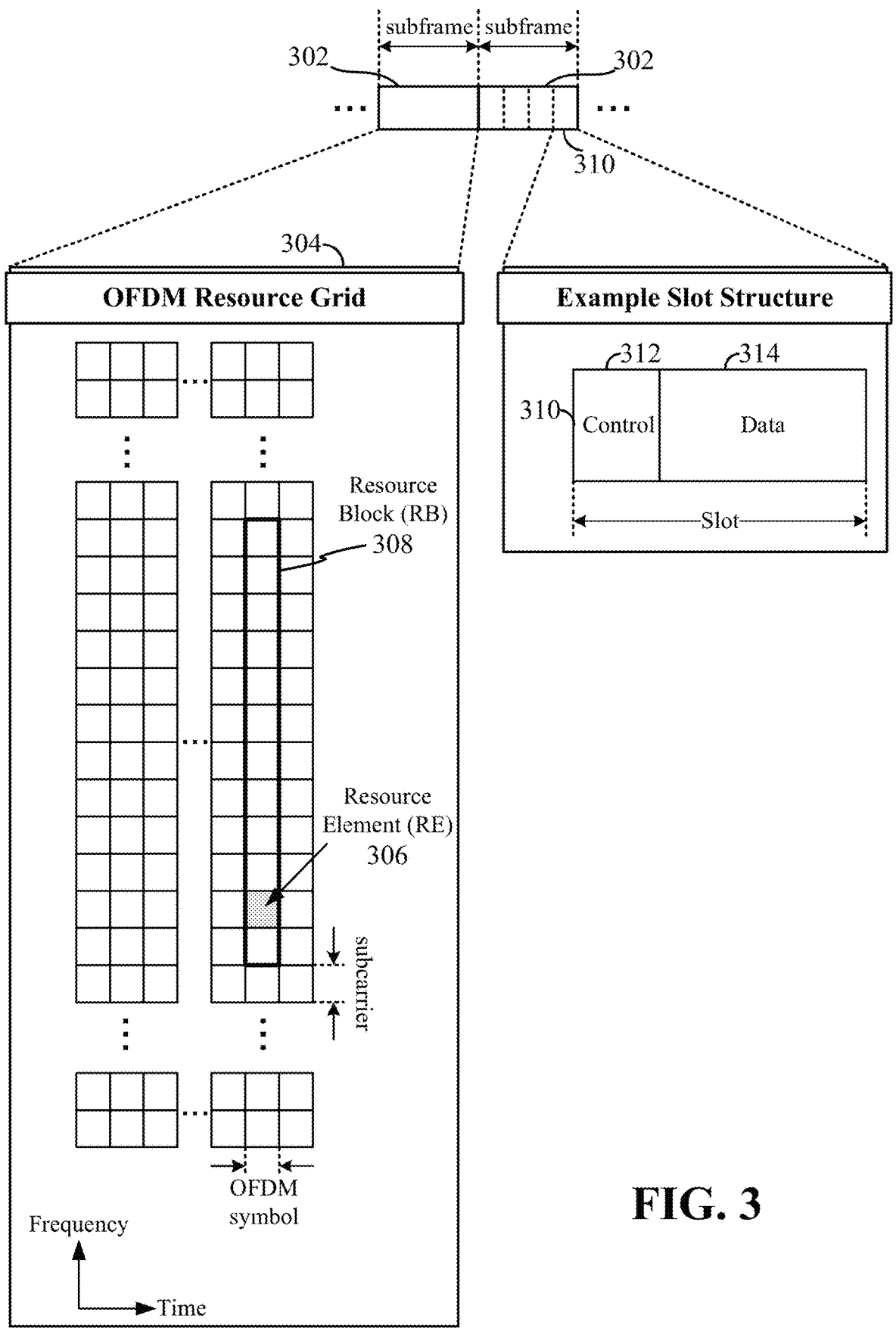
FIG. 3 is a schematic illustration of an organization of wireless resources in an air interface utilizing orthogonal frequency divisional multiplexing (OFDM) according to some aspects.

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DMRS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure. The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 306 to carry UL control information (UCI) 118. The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DMRS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1-3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
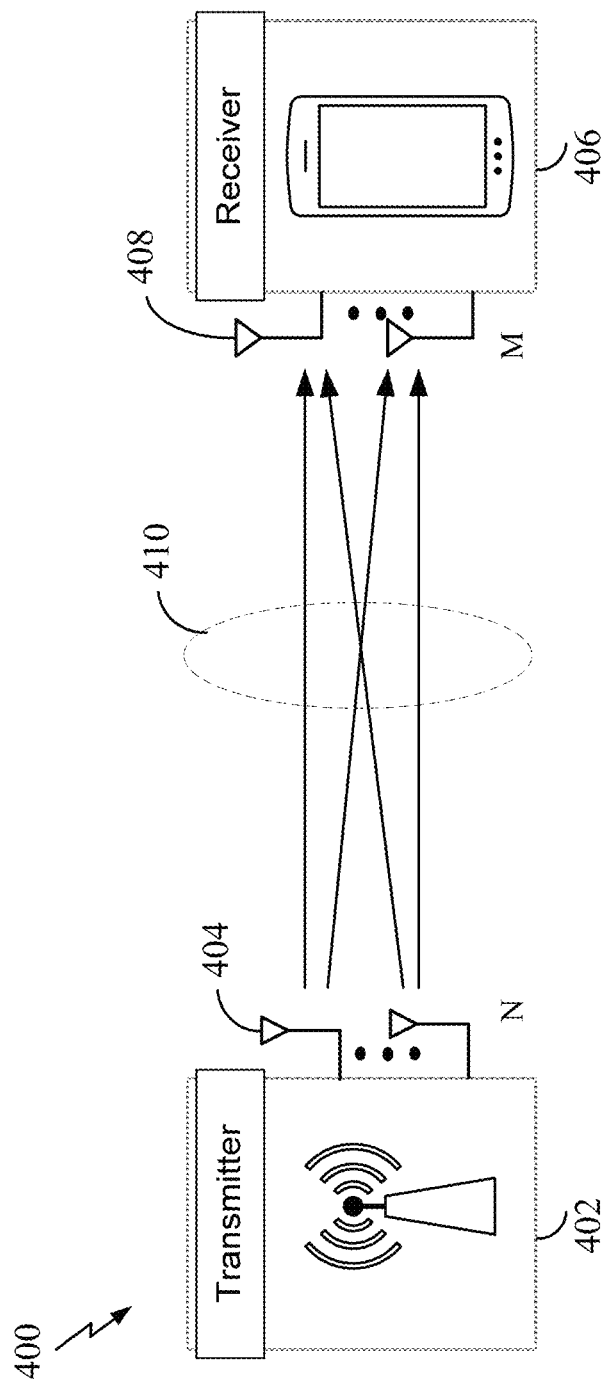
FIG. 4 is a block diagram illustrating a transmitting device and a receiving device supporting multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the scheduling entity (e.g., base station) may assign the rank for DL MIMO transmissions based on UL SINR measurements (e.g., based on a Sounding Reference Signal (SRS) transmitted from the UE or other pilot signal). Based on the assigned rank, the base station may then transmit DMRS and/or CSI-RS with separate RS sequences for each layer to provide for multi-layer channel estimation. From the CSI-RS, the UE may measure the channel quality across layers and resource blocks, and feed back the RI and a channel quality indicator (CQI) that indicates to the base station a MCS to use for transmissions to the UE for use in updating the rank and assigning REs for future downlink transmissions.

In the simplest case, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Semi-Persistent Scheduling (SPS) of Communication Resources

Scheduling is a process of allocating communication or wireless resources (e.g., time, frequency, and spatial resources) in a wireless communication system 100. A scheduling entity 108 (e.g., gNB or eNB) can schedule communication resources using a dynamic scheduling method and/or semi-persistent scheduling (SPS) method. In dynamic scheduling, the scheduling entity can schedule and allocate resources for each communication (e.g., PDSCH/PUSCH, and PUCCH) between the scheduling entity and a UE using DCI and/or MAC CE. To reduce communication overhead, the scheduling entity can schedule resources in a semi-static or semi-persistent manner using SPS techniques.

Using SPS, the scheduling entity can configure one or more SPS occasions using one or more radio resource control (RRC) messages (e.g., SPS-Config message). For example, each SPS occasion can include downlink (DL) resources and/or uplink (UL) resources. In some examples, the scheduling entity can transmit a single trigger signal (e.g., DCI) to activate one or more SPS occasions configured in an SPS configuration. In some aspects, the scheduling entity can transmit a trigger signal (e.g., DCI, DMRS, or CSI-RS) to trigger channel and/or interference reports using SPS resources.

Figure 5:
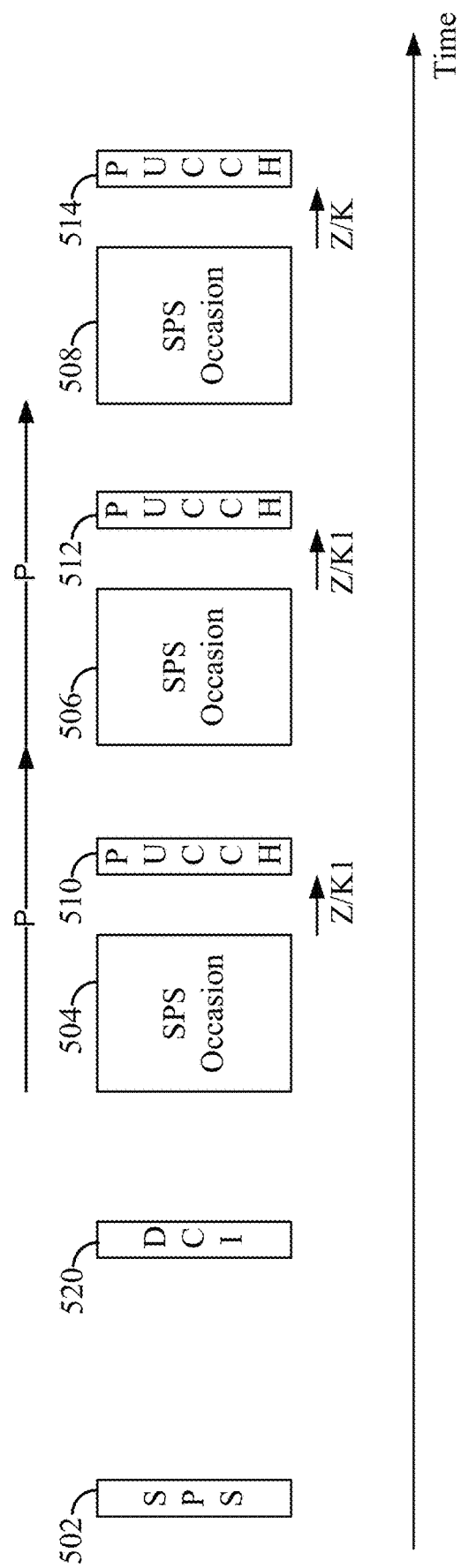
FIG. 5 is a diagram illustrating an exemplary semi-persistent scheduling (SPS) configuration for wireless communication according to some aspects.

FIG. 5 is a diagram illustrating an exemplary SPS configuration for wireless communication according to some aspects. A scheduling entity 108 can transmit one or more SPS configurations to a UE 106 using SPS signaling 502 (control information). In one example, the SPS signaling 502 may be an RRC message that can configure one or more SPS configurations. In some examples, the RRC message may provide the one or more SPS configurations or index value(s) of the one or more SPS configurations. In some examples, each SPS configuration can be identifiable by a corresponding index value (e.g., index 0 for SPS configuration 0, index 1 for SPS configuration 1, etc.). In some aspects, the scheduling entity can use a different index for each SPS configuration.

In some aspects, the same index can identify one or more SPS configurations, for example, a data SPS configuration for downlink data and a measurement SPS configuration for channel/interference measurements. The scheduling entity can configure both SPS configurations, for example, using RRC and/or MAC CE signaling. In addition to the SPS configuration index, the scheduling entity can use a field (e.g., a flag) in a DCI to indicate whether the same index signals the data SPS configuration or measurement SPS configuration. Therefore, the UE can determine whether the downlink data SPS configuration or the channel/interference measurement SPS configuration is activated by the index, and use the corresponding periodicity P and feedback timing (e.g., K1 for PDSCH or Z for channel measurements).

In some aspects, the RRC message may use a different index to identify each configured SPS configuration. An SPS configuration can schedule and allocate periodic communication resources (e.g., time, frequency, and spatial resources) to a plurality of SPS occasions that have a predetermined periodicity P or cyclic pattern. The scheduling entity can configure multiple SPS configurations for downlink data and/or channel measurements. Then, the scheduling entity can transmit a DCI 520 to the UE to trigger or activate the desired SPS configuration. In one example, the DCI 520 may include an index to identify the triggered or activated SPS configuration with the corresponding periodicity and feedback timing (e.g., report timing parameter K1 for downlink data and report timing parameter Z for channel report). In some examples, the timing parameters K1 and Z can indicate the time slot of the PUCCH occasion for transmitting the feedback or channel measurements after the associated SPS occasion. In some aspects, an SPS configuration can include both downlink data (e.g., PDSCH) and channel measurement resources across different SPS occasions.

Three exemplary SPS occasions (e.g., first to third SPS occasions 504, 506, 508) and corresponding PUCCH occasions (e.g., first to third PUCCH occasions 510, 512, 514) are shown in FIG. 5 in the time domain Each PUCCH occasion can be used for HARQ feedback or channel/interference measurements according to the triggered SPS configuration. In other aspects, an SPS configuration may have more or fewer than three SPS occasions. The scheduling entity may configure the PUCCH occasion to occur at a predetermined time after the associated SPS occasion. In one example, a PUCCH occasion for HARQ feedback may be at K1 slots after the associated SPS occasion carrying the downlink data (e.g., PDSCH), and a PUCCH occasion for channel/interference measurements may be at Z slots after the associated SPS occasion providing the resources for channel/interference measurements. In some aspects, the scheduling entity may configure UL resources of the PUCCH occasions by transmitting a PUCCH resource configuration to the UE or including the PUCCH configuration as a part of the SPS configuration. In some examples, the PUCCH resources may be preconfigured by the network.

Figure 6:
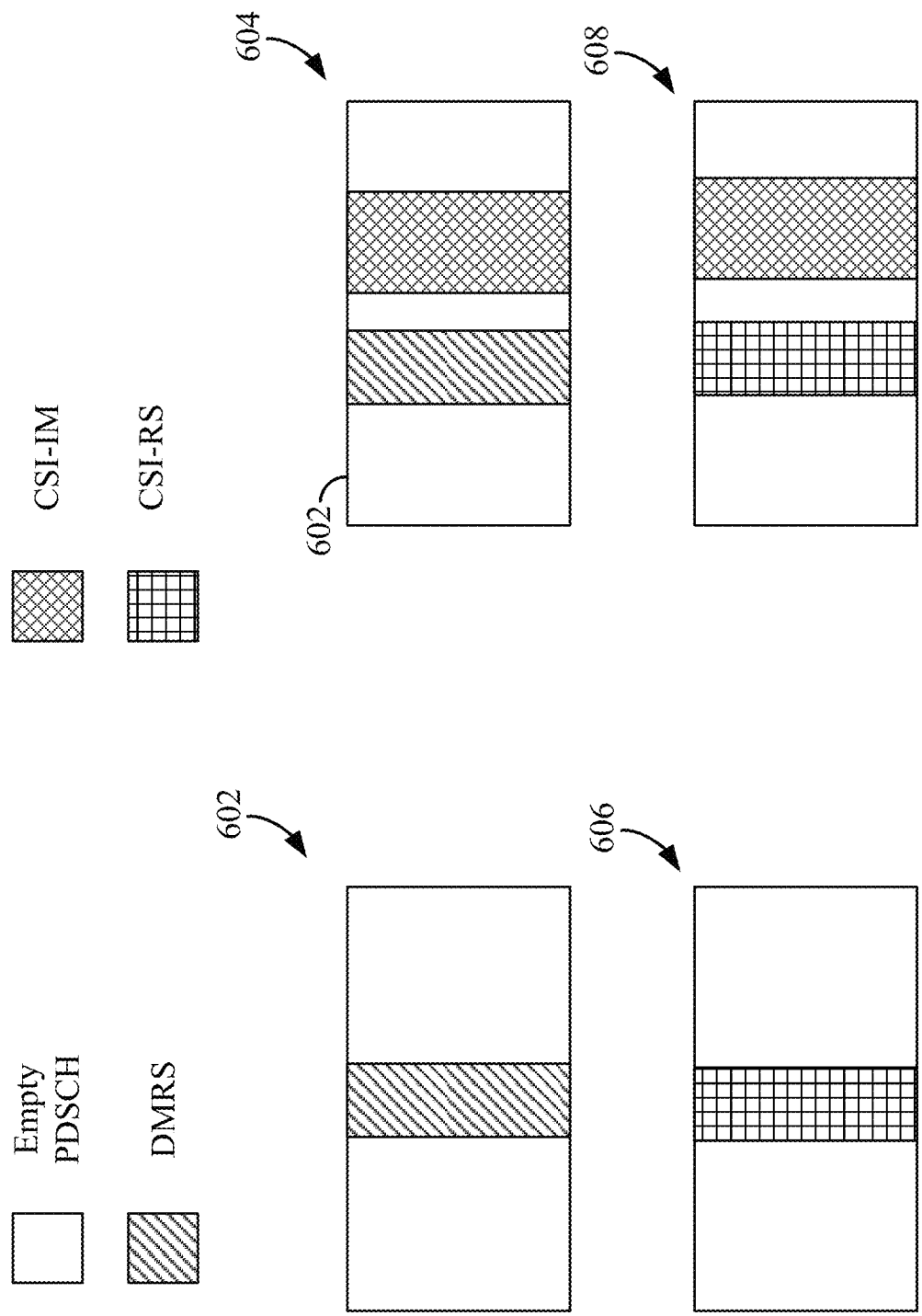
FIG. 6 is a diagram illustrating some exemplary SPS occasion configurations according to some aspects.

In some aspects, an SPS occasion (e.g., SPS occasions 504, 506, and 508) can provide resources allocated for downlink data (e.g., PDSCH), reference signals (e.g., DMRS and CSI-RS) for channel measurements, and/or resources (e.g., CSI-IM resources) for interference measurement. FIG. 6 is a diagram illustrating some exemplary SPS occasion resource configurations usable for channel and/or interference measurements according to some aspects. In a first exemplary SPS occasion 602, some or all resources may be allocated to DMRS. The UE can use the DMRS for channel measurements (e.g., reference signals received power (RSRP)). Other resources of the first SPS occasion 602 may be empty PDSCH resources that may or may not carry DL data. When PDSCH resources are not used for transmitting DL data, the UE can use the empty PDSCH resources to perform interference measurements (e.g., interference from nearby wireless devices). PDSCH resources are considered as empty resources when the scheduling entity does not transmit downlink data or payload using the PDSCH resources. When the UE performs any channel/interference measurements in an SPS occasion, the UE can transmit a channel report that includes the channel/interference measurements in a PUCCH occasion associated with the SPS occasion (e.g., Z slots after the SPS occasion according to the SPS configuration). Some examples of channel measurements include CQI, RI, and channel characteristics. Some examples of channel characteristics include delay spread and Doppler spread.

In a second exemplary SPS occasion 604, some or all resources may be allocated to a DMRS and interference measurement resources (CSI-IM). The CSI-IM may be located in the same bandwidth part (BWP) used for user data (e.g., PDSCH). In some aspects, the scheduling entity may transmit a zero power reference signal or symbol in the CSI-IM. When the second SPS occasion 604 is used, the UE can assume that the scheduling entity has not allocated the CSI-IM to other devices so that the UE can perform interference measurements using the CSI-IM. In some aspects, the CSI-IM may include empty symbols for facilitating interference measurements. Using the CSI-IM, the UE can measure interference from other transmitters in order to generate an interference report. Then the UE can transmit the interference report in a PUCCH occasion associated with the second SPS occasion 604. In some aspects, the interference report may include one or more of: an interference pattern in time and/or frequency, interference power, interference covariance matrix eigenvalues, a ratio between eigenvalues of the interference covariance matrix, an interference covariance matrix, and an interference covariance matrix rank. In some aspects, the report may include a wideband or a single band report.

In a third exemplary SPS occasion 606, some or all resources may be allocated to a channel-state information reference signal (CSI-RS). The UE can use the CSI-RS to perform channel measurements, for example, CQI, rank indicator (RI), precoding matrix indicator (PMI), and CSI-based RSRP. Then the UE can transmit a report including the channel measurements in a PUCCH occasion associated with the third exemplary SPS occasion 606.

In a fourth exemplary SPS occasion 608, some or all resources may be allocated to CSI-RS and CSI-IM. The UE can use the CSI-RS for channel measurements and CSI-IM for interference measurements as described above. Then the UE can transmit a report including the channel and interference measurements in a PUCCH occasion associated with the fourth exemplary SPS occasion 608. In other examples, an SPS occasion may have any combinations of DMRS, CSI-RS, and/or CSI-IM resources besides those illustrated in FIG. 6.

In some aspects, an SPS configuration may schedule a certain configuration of empty PDSCH, DMRS, CSI-RS, and/or CSI-IM in every instance of configured SPS occasions. In some aspects, an SPS configuration may schedule a certain configuration of empty PDSCH, DMRS, CSI-RS, and/or CSI-IM in every X instances of configured SPS occasions (X is 1 or more) configured by the SPS configuration. In some aspects, the scheduling entity can signal the value of X in an RRC message, MAC CE, or DCI. In some aspects, the SPS configuration may provide an initial or default value of X.

After one or more SPS configurations are configured, the scheduling entity can transmit a control signal (e.g., one or more DCIs 520 in a PDCCH) to activate, reactivate, or deactivate the configured SPS configuration(s) at the UE. In one aspect, the DCI can indicate the index of an SPS configuration that is activated, deactivated, or reactivated. In some examples, a DCI can include one or more indexes to trigger the corresponding SPS configuration(s).

Figure 7:
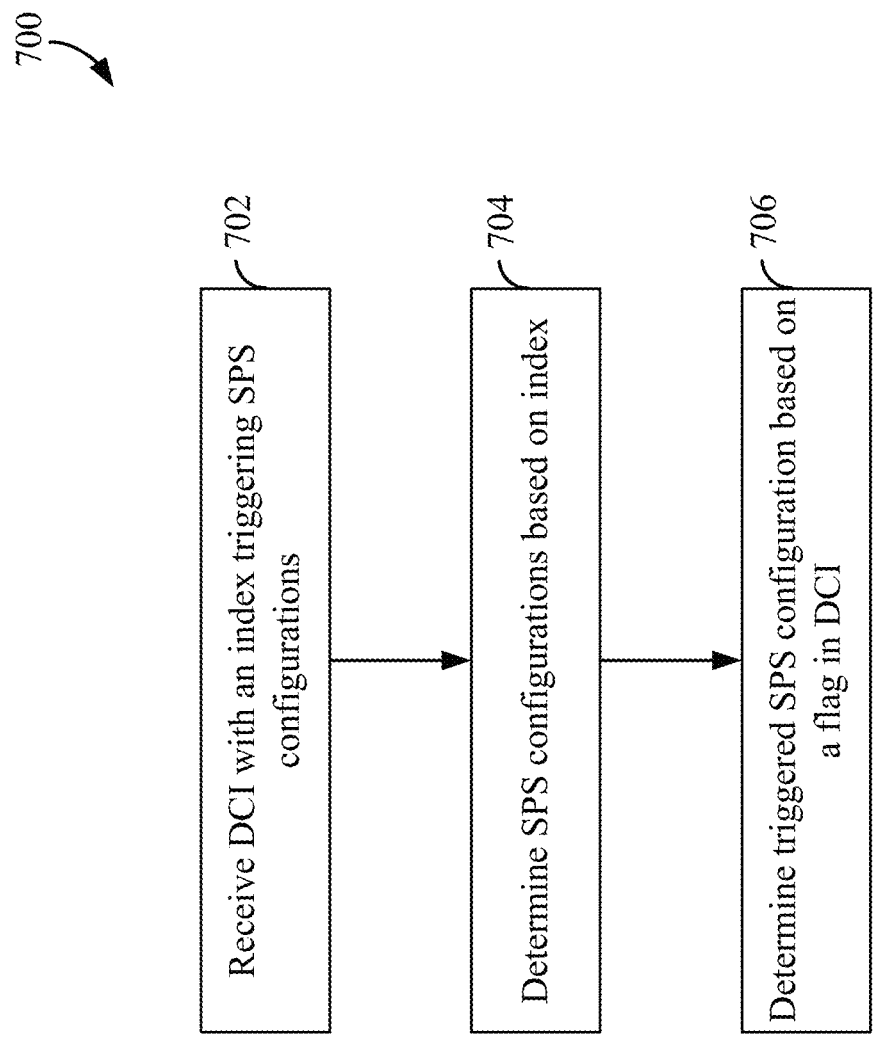
FIG. 7 is a flow chart illustrating a process for triggering an SPS configuration using an index and a flag included in downlink control information (DCI) according to some aspects.

FIG. 7 is a flow chart illustrating a process 700 for activating or triggering an SPS configuration using an index and a flag in a DCI according to some aspects. The scheduling entity can transmit a DCI (e.g., DCI 520) that includes an SPS configuration index corresponding to multiple SPS configurations. At block 702, a UE can receive the DCI including an index that can trigger multiple SPS configurations. At block 704, the UE can determine the SPS configurations (e.g., a downlink data SPS configuration and a channel measurement SPS configuration) corresponding to the same index. The DCI further includes a field (e.g., an SPS flag) to indicate whether the index triggers or activates the downlink data SPS configuration or measurement SPS configuration. At block 706, the UE can determine whether the downlink data SPS configuration or measurement SPS configuration is triggered based on the SPS flag.

Figure 8:
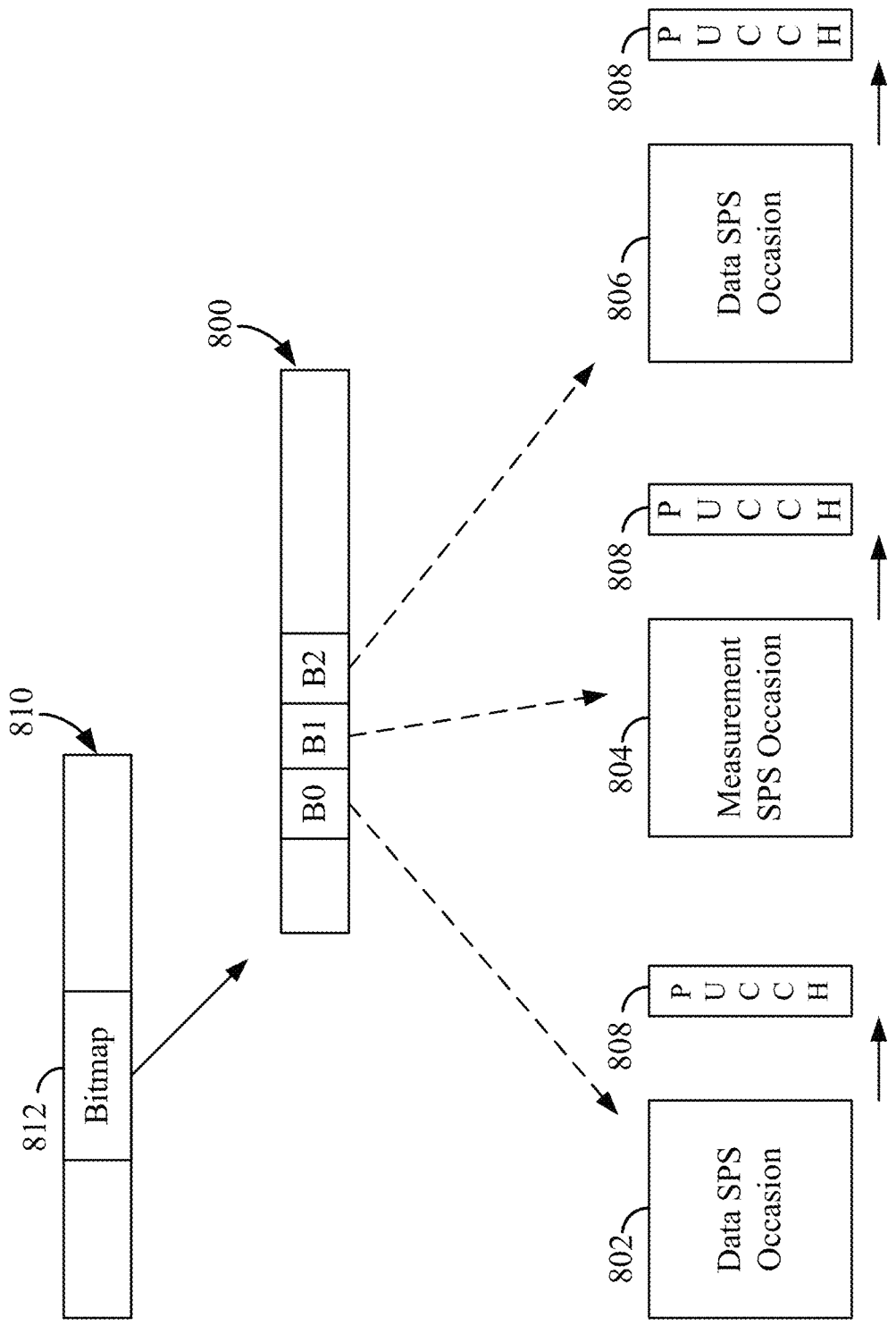
FIG. 8 is a diagram illustrating a DCI using a bitmap for triggering an SPS configuration according to some aspects.

In some aspects, the DCI may include a bitmap that can trigger a combined SPS configuration that includes both data SPS occasions and channel measurement SPS occasions. FIG. 8 is a diagram illustrating a DCI 800 including a bitmap for triggering an SPS configuration according to some aspects. Each bit of the bitmap can correspond to an SPS occasion. Three exemplary bits (B0, B1, and B2) of the bitmap are shown in FIG. 8. Based on the bit value (0 or 1) and position of each bit, the UE can determine whether the associated SPS occasion is used for downlink data (e.g., PDSCH) or channel/interference measurement. For example, a first bit (B0) of the bitmap can indicate that a first SPS occasion 802 is a data SPS occasion. A second bit (B1) of the bitmap can indicate that a second SPS occasion 804 is a measurement SPS occasion. A third bit (B2) of the bitmap can indicate that a third SPS occasion 806 is a data SPS occasion. Based on the bitmap, the UE can use the correct periodicity and report timing parameter (Z or K) for transmitting the feedback (e.g., ACK or CSI report) to the scheduling entity in the corresponding PUCCH occasions 808.

In some aspects, the scheduling entity can configure a set of bitmaps (e.g., bitmap 812) for triggering the combined SPS configuration with different combinations of data SPS occasions and measurement SPS occasions. Based on the bit values of each bitmap, each bitmap can trigger a certain combination of data SPS occasion(s) and measurement SPS occasion(s). Then the scheduling entity can use a DCI 810 to select one of the bitmaps to trigger the desired SPS occasions corresponding to the selected bitmap. For example, the DCI 810 has a field 812 (e.g., bitmap index) that indicates the selected bitmap. In some aspects, the scheduling entity can use RRC or MAC CE to communicate the set of bitmaps to the UE to reduce the DCI payload. In some aspects, the bitmap can be a part of an SPS configuration. In this case, the scheduling entity can signal the selected bitmap using a bitmap index in the DCI.

When an SPS configuration is activated or reactivated, the scheduling entity can use the DCI to configure one or more transmission parameters, for example, MCS, resource allocations, DMRS configuration, beamforming, precoding, etc. For each activated SPS configuration, the UE can use the PUCCH occasions (e.g., PUCCH occasions 506) for transmitting uplink control information (UCI) that may include HARQ feedback, a scheduling request (SR), and a channel report that can include channel characteristic measurements and/or interference measurements.

The UE can use different PUCCH formats for transmitting the UCI based on its content and/or size. Different PUCCH formats (e.g., formats 0-4) may have different durations (e.g., symbol lengths) and number of UCI payload bits. For example, a PUCCH format can include one or more of: number of PRBs, starting PRB, starting symbol, and number of symbols.

A scheduling entity can use the above described SPS configurations or the like to efficiently schedule frequent or periodic channel and interference measurements using SPS resources with low signaling overhead. Therefore, the scheduling entity can have more up-to-date information on the channel characteristics from the UE's point of view. The UE measurements can help the scheduling entity in channel precoding, interference/noise/channel estimation and prediction, and MCS and transmission configuration selection. The UE also benefit from having up-to-date information on the channel characteristics that can enhance noise, interference, and/or channel estimation over time. Having up-to-date channel and interference information can enhance data decoding and can result in a lower error rate and higher data rate.

Report of Channel and Interference Measurements

In some aspects, an SPS configuration may configure the UE to transmit a channel report for each configured SPS occasion. A channel report can include channel characteristic measurements and/or interference measurements. In some aspects, an SPS configuration may configure the UE to transmit one channel report for a block or a predetermined number of SPS occasions. In this case, the UE does not transmit a channel report in each SPS occasion. A block of SPS occasions may include N number of SPS occasions (N is an integer equal to 1 or larger). In one example, when N has a value of 3, the UE can transmit a channel report for every three SPS occasions.

Figure 9:
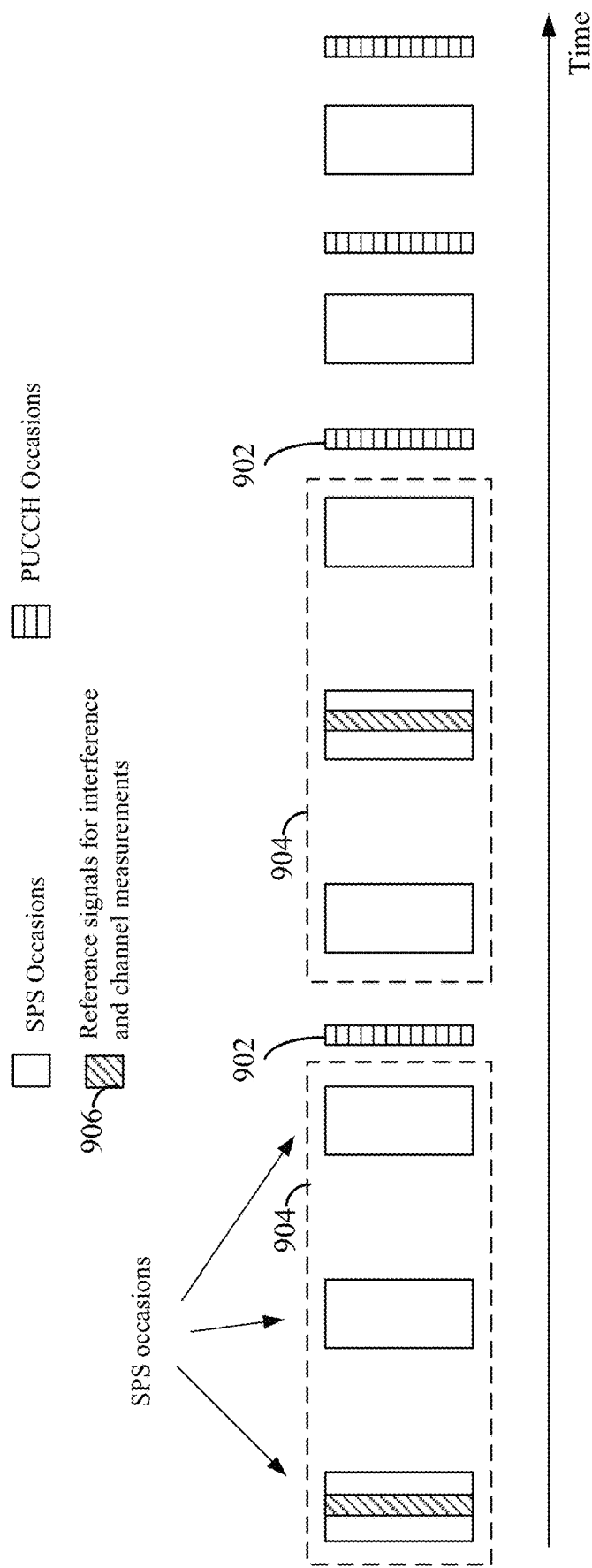
FIG. 9 is a diagram illustrating an exemplary process for providing a channel report for a block of SPS occasions according to some aspects.

FIG. 9 is a diagram illustrating an example of providing a channel report for a block of SPS occasions according to some aspects. The UE can transmit a single channel report in a PUCCH occasion 902 for a block 904 of SPS occasions. FIG. 9 illustrates an exemplary block 904 of SPS occasions including three SPS occasions. In some aspects, the periodicity of the channel report can be different from the periodicity of the reference signals (e.g., DMRS and/or CSI-RS) for channel measurements and/or interference measurement resources (e.g., CSI-IM or empty PDSCH). In the example shown in FIG. 9, the scheduling entity can transmit the reference signals 906 for every four SPS occasions, and the UE can transmit the channel report for every three SPS occasions. In some aspects, the scheduling entity can change the transmission/retransmission parameters of one or more SPS configurations or occasions (e.g., PDSCH occasions) as needed, for example, using DCI, RRC, and/or MAC CE, based on the channel report.

In some aspects, the size (e.g., number of bits or packets) of a channel report can change depending on the content of the channel report. For example, the UE can use S1 number of bits for reporting channel interference measurements (e.g., CSI-IM based interference report) and S2 number of bits for reporting channel measurements (e.g., CSI report). Therefore, the total number of bits in a particular channel report can include S1, S2, or S1+S2 bits depending on the content of the channel report for a certain SPS block or SPS occasion(s).

In some aspects, the scheduling entity and UE can fix the size of the channel report. In this case, when the UE transmits a report including channel measurements and/or interference measurements, the UE may need to reduce the size of the report to fit in the fixed report size. In one example, the UE can use a data compression technique to reduce the size of the data. In another example, the channel report can include only a subset of the information of the channel/interference measurements. In other examples, the UE can use any suitable technique or a combination of techniques (e.g., compression or inclusion of only a subset of information) to reduce the size of the channel report.

PUCCH Resource Configuration and Selection

In some aspects, the scheduling entity can configure multiple PUCCH resources (e.g., time, frequency, and spatial resources) for transmitting channel and/or interference measurements according to an SPS configuration. For example, multiple PUCCH resources can be configured using an RRC message PUCCH-Config (e.g., SPS-PUCCH-LIST or multi-CSI-PUCCH-list). In some aspects, the scheduling entity can configure one or more common PUCCH resources for all configured SPS configurations. In some aspects, the scheduling entity can configure a PUCCH resource for a specific SPS configuration. In some aspects, a UE can use the configured PUCCH resources, for example, defined in SPS-PUCCH-LIST or multi-CSI-PUCCH-list, to send accumulated HARQ feedback for a block of SPS occasions (e.g., block 904 in FIG. 9) and channel measurement reports based on aperiodic, periodic, and/or semi-persistent channel/interference measurement references (e.g., based on CSI-RS, DMRS, or CSI-IM).

In one aspect, when an SPS configuration configures a single channel report per SPS occasion, the scheduling entity can configure one or more PUCCH resources that can support the number of bits in the channel report, and assign the specific PUCCH resource in the DCI that triggers the SPS configuration.

In one aspect, a UE may need to transmit one or more channel reports during the same PUCCH occasion. In that case, the scheduling entity can configure one or more PUCCH resources that can be used for transmitting multiple channel reports in the same PUCCH occasion, and the UE can select the PUCCH resource(s) based on the size (number of bits or packets) of the channel report(s). The configured PUCCH resources may have different formats (e.g., format types 0-4) that can carry different payload sizes. For example, the scheduling entity can configure two PUCCH resources (PUCCH resource 0 and resource 1) with different PUCCH formats. For example, PUCCH resource 0 can be used for a channel report that has a size of 2 bits or smaller, and PUCCH resource 1 can be used for a channel report that has a size larger than 2 bits. In some examples, the SPS configuration can indicate a specific PUCCH resource regardless of the size of the channel report payload.

Figure 10:
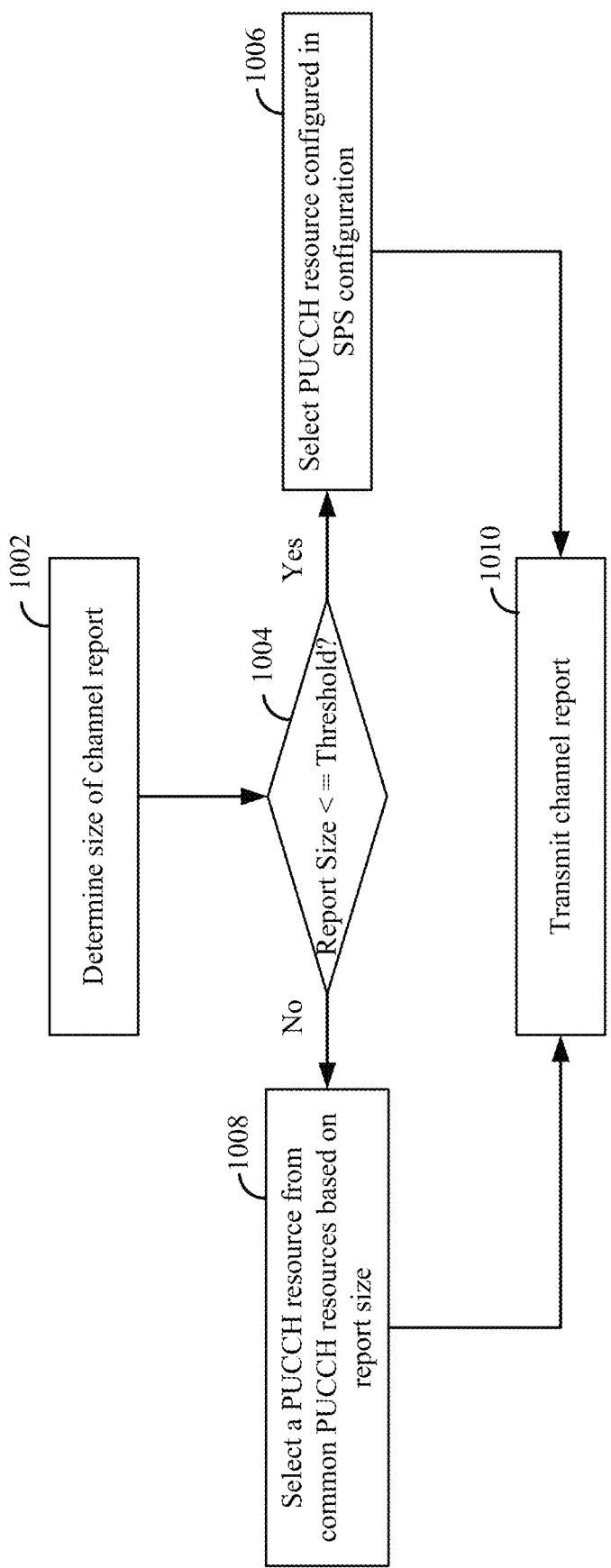
FIG. 10 is a flow chart illustrating a method for selecting an uplink control information resource for transmitting a channel report according to some aspects.

FIG. 10 is a flow chart illustrating a method for selecting a PUCCH resource for transmitting a channel report according to some aspects. As described above, the scheduling entity can configure or preconfigure one or more common PUCCH resources for transmitting multiple configured channel reports in the same slot, and configure a specific PUCCH resource in an SPS configuration or occasion to transmit a single channel report. For example, a UE may have a configured channel report for transmission in a certain SPS occasion/PUCCH like those described above in relation to FIGS. 5-9. To that end, at block 1002, the UE determines the size (e.g., number of bits or packets) of the channel report. For example, the channel report may include channel measurements and/or interference measurements.

At decision block 1004, the UE determines whether the report size is smaller than or equal to a predetermined threshold. For example, the predetermined threshold may be a predetermined number of bits or packets. In one example, the predetermined threshold may be a number of bits corresponding to one data packet.

At block 1006, if the channel report size is equal to or smaller than the predetermined threshold, the UE can select a PUCCH resource indicated in the SPS configuration that configures the SPS occasion(s) associated with the channel report. At block 1008, if the channel report size is greater than the predetermined threshold, the UE can select a PUCCH resource from preconfigured common PUCCH resources. In some aspects, the UE can select the PUCCH resource based on the size (e.g., number of bits or packets) of the channel report. For example, the preconfigured common PUCCH resources may include a first PUCCH resource and a second PUCCH resource that is different from the first PUCCH resource in terms of time, frequency, and/or spatial resources. In one example, the UE may select the first PUCCH resource when the channel report has a number of bits smaller than or equal to a first size, and select the second PUCCH resource when the channel report has a number of bits greater than the first size. In other examples, the preconfigured PUCCH resources may include more than two PUCCH resources that can be used for different channel report payload sizes.

In some aspects, the scheduling entity may not configure a specific PUCCH resource for each SPS configuration. In that case, the scheduling entity can configure one or more common PUCCH resources for use by all SPS configurations. When a UE needs to transmit a channel report, the UE can select a common PUCCH resource irrespective of the size of the payload report. In some aspects, the scheduling entity may configure the same PUCCH resources to be used for HARQ feedback (e.g., ACK/NACK for PDSCH) and channel report. For example, the scheduling entity can configure one or more common PUCCH resources per SPS configuration for HARQ feedback and CSI reporting.

Figure 11:
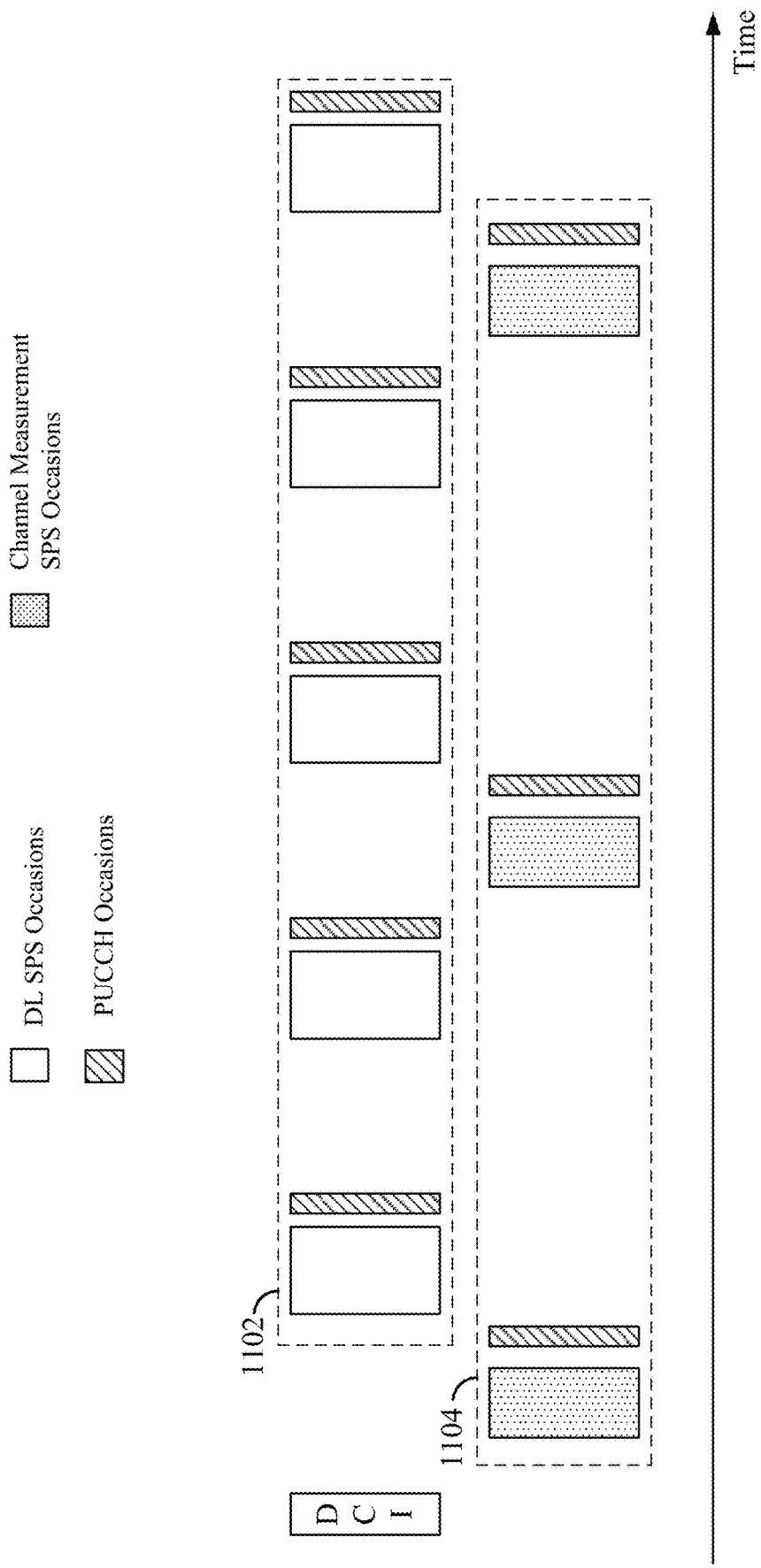
FIG. 11 is a diagram illustrating an SPS configuration for downlink data and an SPS configuration for channel/interference measurements with different timing and periodicity according to some aspects.

In some aspects, a scheduling entity (e.g., gNB or base station) can configure two SPS configurations with different starting time and/or periodicity. FIG. 11 is a diagram illustrating a downlink data (e.g., PDSCH) SPS configuration 1102 and a channel and interference measurements SPS configuration 1104 that are different in starting time and periodicity. In one aspect, the scheduling entity/UE can use the same beamforming (e.g., same DL beam and/or UL beam) for both SPS configurations 1102 and 1104. Therefore, the scheduling entity can use the same precoding for a reference signal (e.g., CSI-RS or DMRS) of the SPS configuration 1104 and the PDSCH of the SPS configuration 1102 to improve the accuracy of the channel and interference measurements. In one aspect, the channel reference signal (e.g., CSI-RS or DMRS) for channel measurement and interference measurement resources (e.g., CSI-IM) of the channel and interference measurements SPS configuration can be in the same BWP and resources associated with the SPS PDSCH occasion. In one aspect, the UE can be configured with one or more DMRSs for channel measurement (e.g., DMRS-based RSRP, channel delay spread, channel doppler spread). The UE can perform the channel measurements using each DMRS configuration separately and transmit separate reports or a combined report. In one aspect, the UE can be configured with one or more CSI-RS resources from a single resource set and/or multiple resource sets for channel measurements.

In some aspects, one or more DMRS configurations can be precoded with different precoding matrices, and the UE can send a channel report (e.g., DMRS-based RSRP, channel delay spread, channel doppler spread) for each DMRS configuration or on all DMRS configurations. For each DMRS configuration, the report can include various channel measurements, for example, CQI, RI, DMRS-based RSRP, channel delay spread, channel doppler spread, etc. Based on the channel report, the scheduling entity can decide on the best DMRS configuration and channel parameters (e.g., channel precoding, MCS, etc.) for use in the DL transmission.

In some aspects, a single SPS configuration can include both DL data SPS occasion and channel/interference measurement SPS occasion such that both SPSs occasions can use the same beamforming for signal transmission. In some aspects, the reference signal (e.g., CSI-RS/DMRS) for channel measurements can use the same precoding as the associated DL data (e.g., PDSCH).

Figure 12:
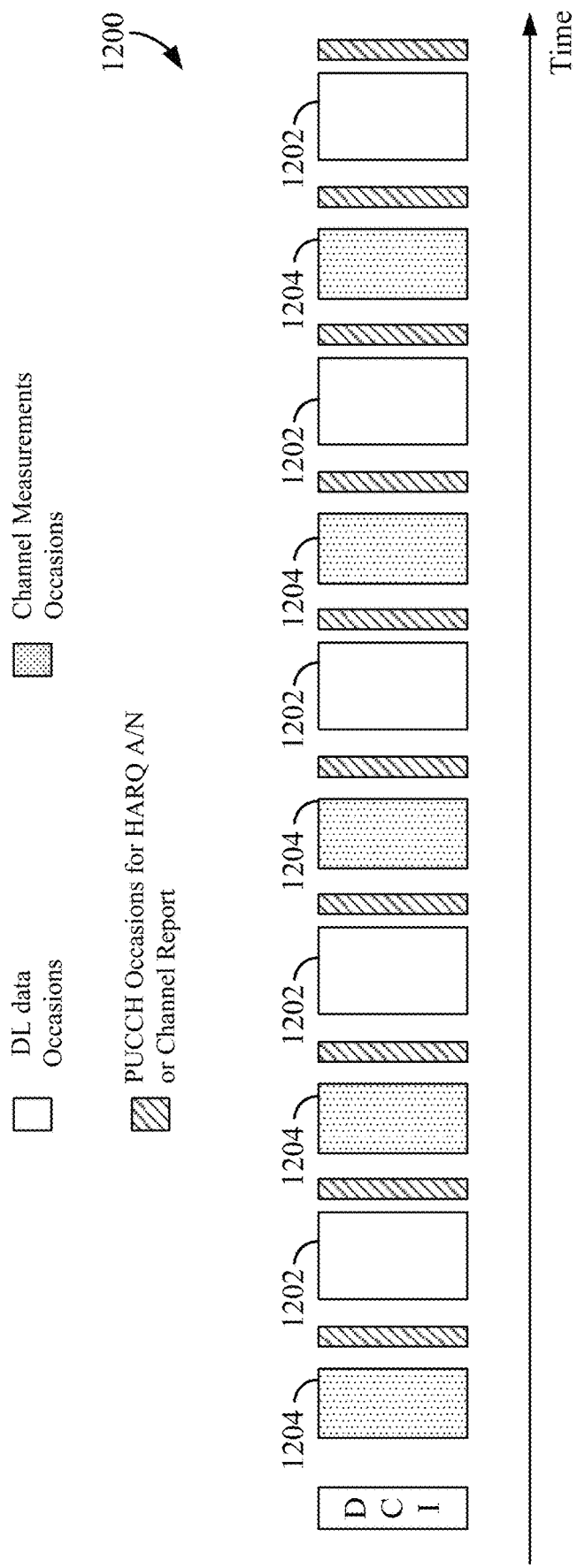
FIG. 12 is a diagram illustrating an exemplary SPS configuration providing both data SPS occasions and channel measurement SPS occasions according to some aspects.

FIG. 12 is a diagram illustrating a combined SPS configuration 1200 providing both DL data occasions and channel/interference measurement occasions according to some aspects. The combined SPS configuration 1200 can include different types of SPS occasions. In this example, the single SPS configuration 1200 provides both DL data occasions 1202 and channel measurement occasions 1204 according to their respective periodicities, starting symbols, and report timing. As described above, the scheduling entity can use a bitmap to trigger (e.g., activate or reactivate) the single SPS configuration 1200 with a particular combination of data occasions and measurement occasions according to the bitmap. For example, a bit "0" corresponds to a DL data SPS occasion, and a bit "1" corresponds to a channel/interference measurement SPS occasion. In one example, the bitmap can be "1010101010" that represents the data SPS occasions 1202 and measurement occasions 1204 shown in FIG. 12. Therefore, a different bitmap results in a different combination of the data occasions 1202 and measurement occasions 1204. In one example, the bitmap may have bit values that can provide more DL data occasions 1202 or bit values that can provide more channel measurement occasions 1204. In other examples, the bitmap can have other bit values for different SPS occasion combinations. The SPS occasions can repeat cyclically or periodically according to the bitmap. In some aspects, the PUCCH resource allocation and selection processes described above can be used with the single SPS bitmap. For example, the PUCCH resource can be used for HARQ feedback for downlink data, and channel report for channel/interference measurements. In some aspects, the above-described SPS resource scheduling techniques can be applied in a wireless network (e.g., RAN 200) using multiple component carriers for providing HARQ feedback according to an SPS configuration.

Triggering Report of Channel Measurements

In some aspects, an SPS configuration may configure the UE to transmit a channel report (e.g., channel and/or interference measurement report) for a configured SPS occasion when the report is triggered by a DMRS transmission. Using DMRS triggering, the scheduling entity can cause the UE to transmit frequent and aperiodic reports. In some aspects, an SPS configuration may configure the UE to measure and/or transmit the interference measurement report (e.g., CSI-IM report) for one or more (e.g., a predetermined number) or a block of SPS occasions upon the occurrence of a DMRS. A block of SPS occasions may include N SPS occasions (N is an integer equal to 2 or larger).

Figure 13:
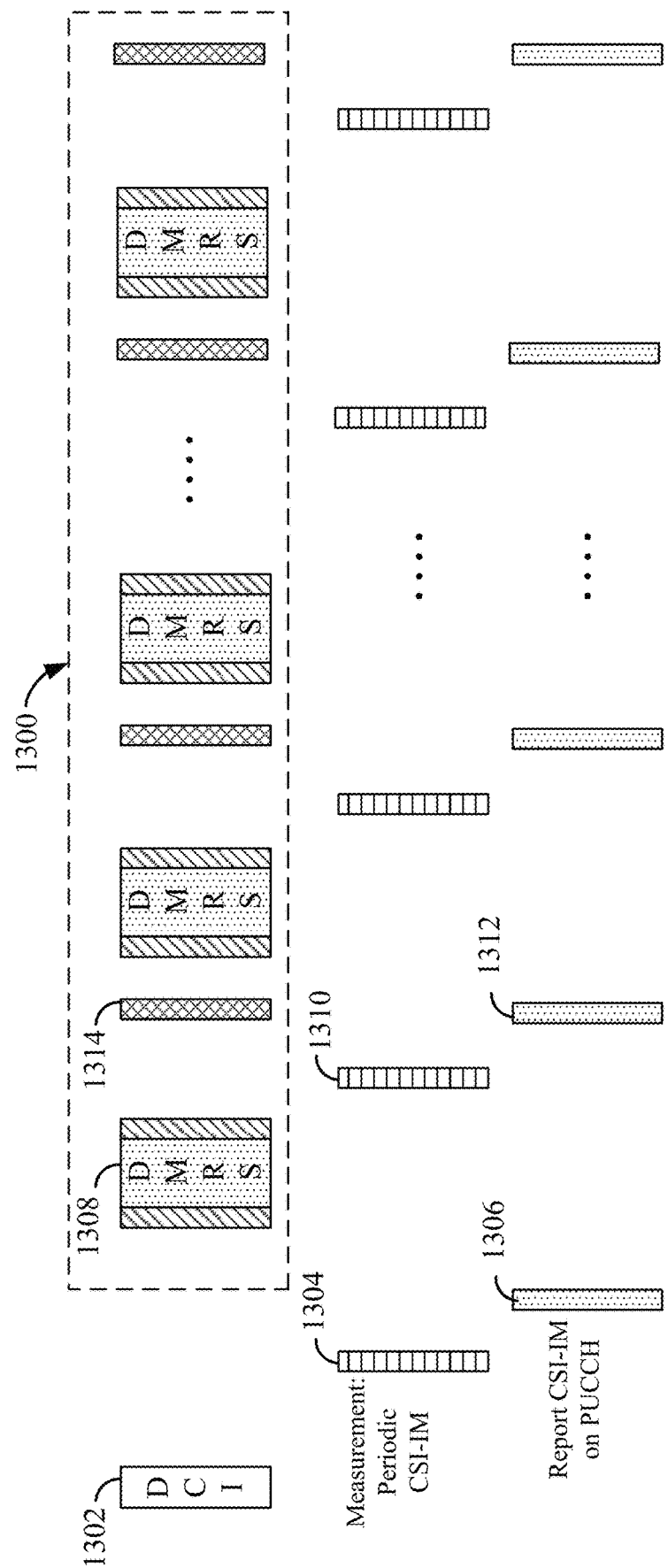
FIG. 13 is a diagram illustrating an example of triggering a channel report by the receipt of a demodulation reference signal (DMRS) in an SPS occasion according to some aspects.

FIG. 13 is a diagram illustrating an example of providing a channel report as triggered by the receipt of a DMRS according to some aspects. An SPS configuration may configure a plurality of SPS occasions 1300 that includes DL occasions and PUCCH occasions. Initially, the UE may receive a DCI 1302, which triggers measurement of interference based on measurement resources (e.g., CSI-IM 1304). Then the UE can transmit a CSI-IM report 1306 (a channel report) to the scheduling entity (e.g., base station) within a PUCCH occasion. Subsequently, the receipt of a DMRS 1308 in an SPS occasion can trigger the measurement of CSI-IM 1310 and transmission of a CSI-IM report 1312 during a PUCCH occasion 1314 associated with the SPS occasion. The CSI-IM report 1312 is an example of a channel report. This process of measuring interference on CSI-IM and transmitting a CSI-IM report may continue upon the occurrence or receipt of a DMRS in an SPS occasion. In one example, unless the SPS PDSCH is empty (i.e., no data and no DMRS), each SPS occasion's DMRS can trigger an aperiodic CSI-IM report that can be sent using certain configured resources (e.g., CSI-IM resources) of the PUCCH.

Figure 14:
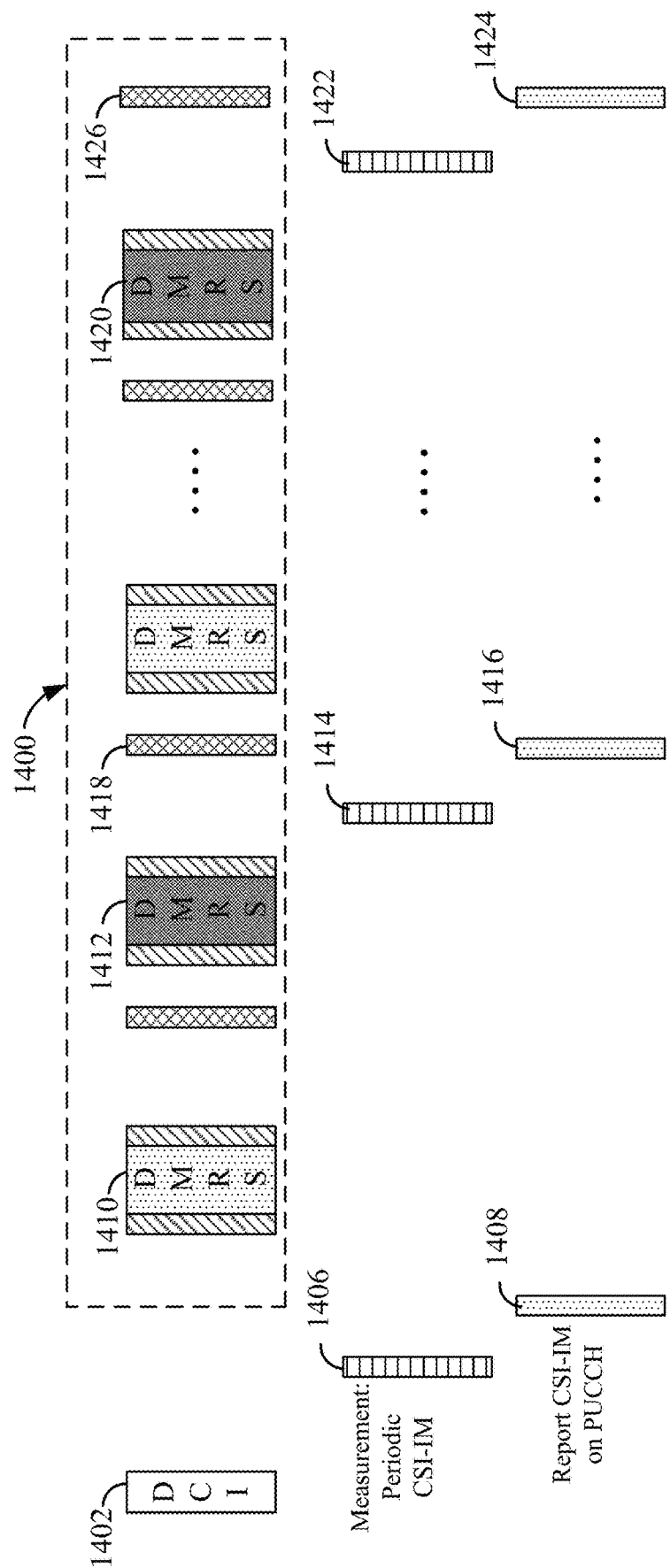
FIG. 14 is a diagram illustrating another example of triggering a channel report by the receipt of a special DMRS in an SPS occasion according to some aspects.

FIG. 14 is a diagram illustrating an example of providing a channel report as triggered by the receipt of a special DMRS. In this example, a scheduling entity can provide at least two types of DMRS in a certain SPS configuration 1400. Initially, the UE may receive a DCI 1402, which can trigger interference measurement based on CSI-IM 1406, for example, in an SPS occasion. Then the UE can transmit a CSI-IM report 1408 to the scheduling entity (e.g., base station or gNB) within a PUCCH occasion.

Subsequently, the receipt of a first type DMRS 1410 in an SPS occasion does not trigger channel interference measurement or reporting. Instead, only receipt of a second type DMRS 1412, rather than the first type DMRS 1410, in an SPS occasion can trigger measurement of CSI-IM 1414 in an SPS occasion and transmission of a CSI-IM report 1416 during a PUCCH occasion 1418 associated with the SPS occasion. This process of measuring CSI-IM and transmitting a CSI-IM report may continue upon the occurrence or receipt of the second type DMRS. For instance, receipt of another second type DMRS 1420 can trigger measurement of CSI-IM 1422 and transmission of a CSI-IM report 1424 during a PUCCH occasion 1426.

In one example, the second type DMRS 1412 may use a different DMRS sequence than the first (nominal) DMRS type 1410, such as a flipped sign of the odd (or even) elements of the first type (nominal) DMRS sequence. For instance, if the first type DMRS (nominal) sequence is [a, b, c, d, e, f], then the second type DMRS sequence can be either [a, −b, c, −d, e, −f] (even elements flipped) or [−a, b, −c, d, −e, f] (odd elements flipped). In general, two DMRSs (e.g., DMRS 1410, 1412, 1420) can be different in pattern, number of symbols, DMRS configuration type, sequence, etc.

Figure 15:
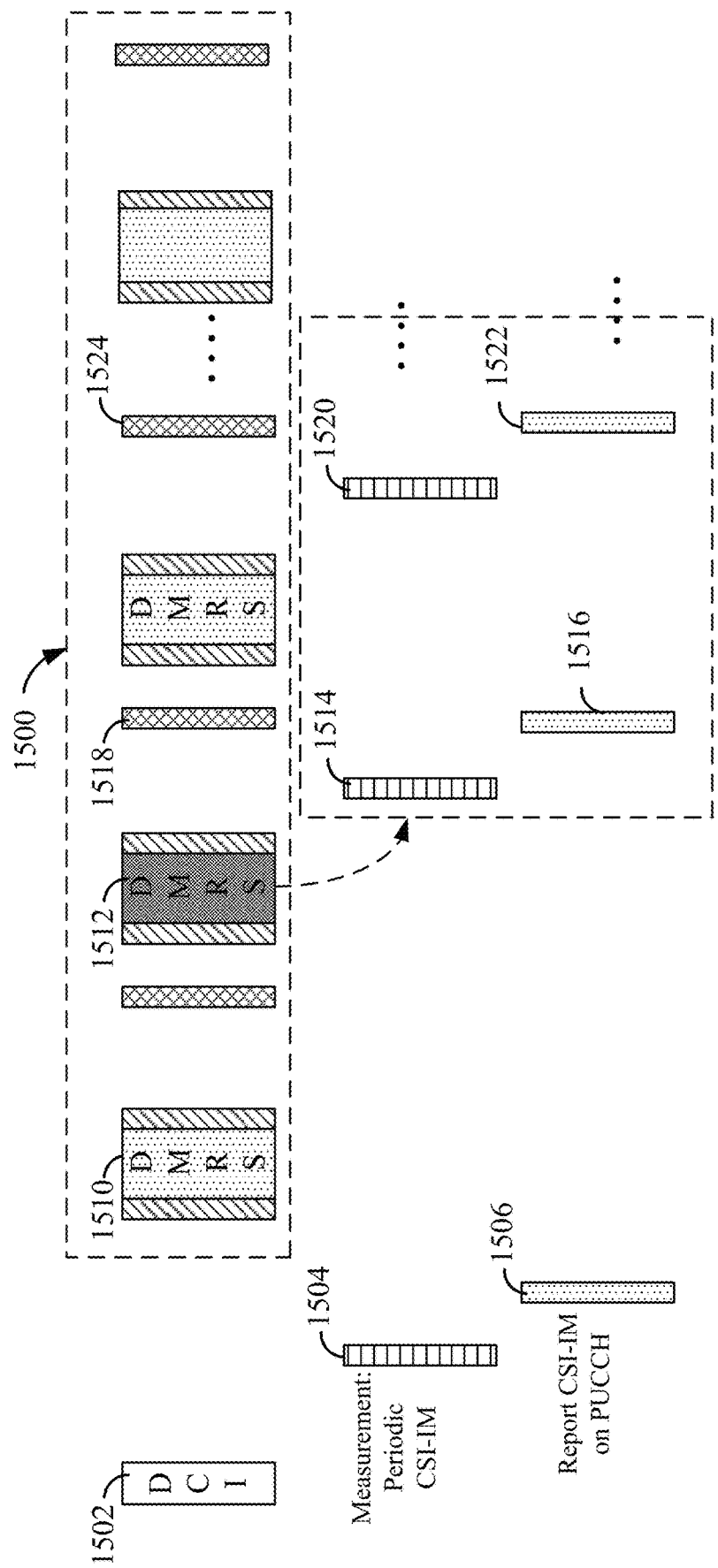
FIG. 15 is a diagram illustrating an example of triggering multiple channel reports by the receipt of a single special DMRS in an SPS occasion according to some aspects.

FIG. 15 is a diagram illustrating an example of providing multiple channel reports, over multiple PUCCH occasions, as triggered by the receipt of a single special DMRS in an SPS configuration 1500. In this example, the scheduling entity can provide at least two DMRS types (e.g., a nominal DMRS and a special DMRS). Receipt of a single (special or specific) DMRS can trigger multiple sequential interference measurement reports on CSI-IM. Initially, the UE may receive a DCI 1502 that triggers the measurement of CSI-IM 1504 during an SPS occasion. Then the UE can transmit a CSI-IM measurement report 1506 to the scheduling entity (e.g., base station or gNB) within a PUCCH occasion.

Subsequently, the receipt of a first type DMRS 1510 in an SPS occasion does not trigger channel interference measurement or reporting. Instead, the receipt of a second type DMRS 1512 (e.g., special DMRS) in an SPS occasion triggers multiple CSI-IM measurements and transmissions of CSI-IM reports over multiple PUCCH occasions. For instance, the second type DMRS 1512 can trigger a first measurement of CSI-IM 1514 and a first CSI-IM report 1516 during a PUCCH occasion 1518. The second type DMRS 1512 (special DMRS) can trigger CSI-IM reporting over one or more subsequent PUCCH occasions, even when a first type DMRS is received in SPS occasions associated with the PUCCHs. For example, the second type DMRS 1512 can trigger a second measurement of CSI-IM 1520 and a second CSI-IM report 1522 during a PUCCH occasion 1524 that is associated with an SPS occasion with a nominal DMRS. The number of CSI-IM measurements and reports that are triggered by a single second type DMRS (special DMRS) may be configurable. In some aspects, the second type DMRS may use a different DMRS sequence than the first type (nominal) DMRS 1510, such as a sign flipped of the odd (or even) elements of the nominal DMRS sequence as described above.

Figure 16:
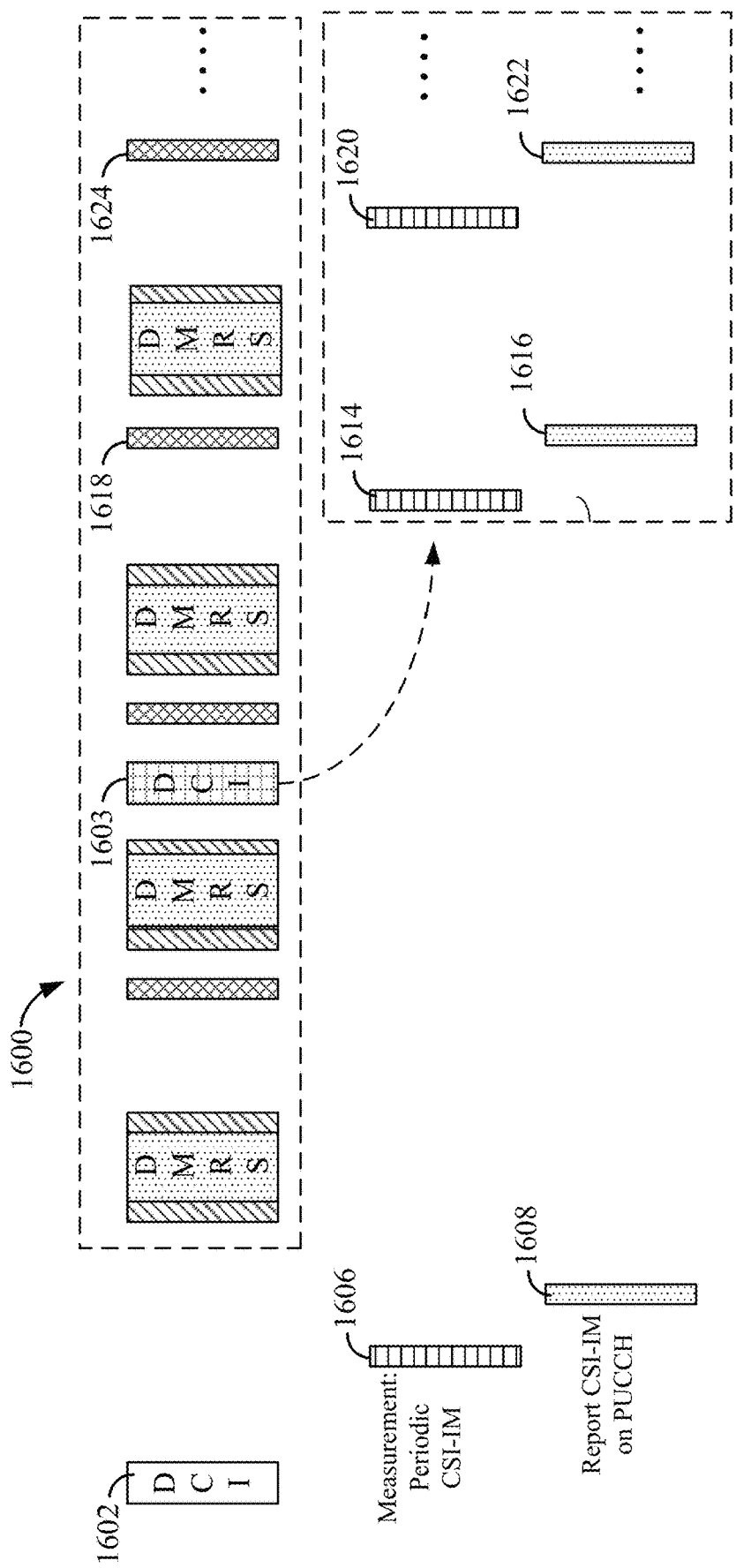
FIG. 16 is a diagram illustrating an example of triggering multiple channel reports by the receipt of a single special DCI in an SPS occasion according to some aspects.

FIG. 16 is a diagram illustrating an example of providing multiple channel reports, over multiple PUCCH occasions, as triggered by the receipt of a single special DCI in an SPS configuration 1600. In this example, the scheduling entity can provide at least two DCI types (e.g., nominal DCI 1602 and special DCI 1603). Receipt of a single DCI 1603 (special DCI) can trigger multiple sequential CSI-IM reports. Initially, the UE may receive a first type DCI 1602, which triggers measurement of CSI-IM 1606 during an SPS occasion. Then the UE can transmit a CSI-IM report 1608 to the scheduling entity (e.g., base station) within a PUCCH occasion.

In this example, subsequent CSI-IM measurements and/or reports are not triggered by receipt of a DMRS. Instead, receipt of a second type DCI 1603 triggers channel interference measurement and reporting. In some aspects, the second type DCI 1603 may trigger multiple CSI-IM measurements and transmissions of CSI-IM reports over multiple PUCCH occasions. For instance, the second type DCI 1603 can trigger a first measurement of CSI-IM 1614 and a first CSI-IM report 1616 during a PUCCH occasion 1618. The second type DCI 1603 also serves to trigger a second measurement of CSI-IM 1620 and a second CSI-IM report 1622 during a PUCCH occasion 1624. The number of CSI-IM measurements and reports that are triggered by a single second type DCI may be configurable.

Figure 17:
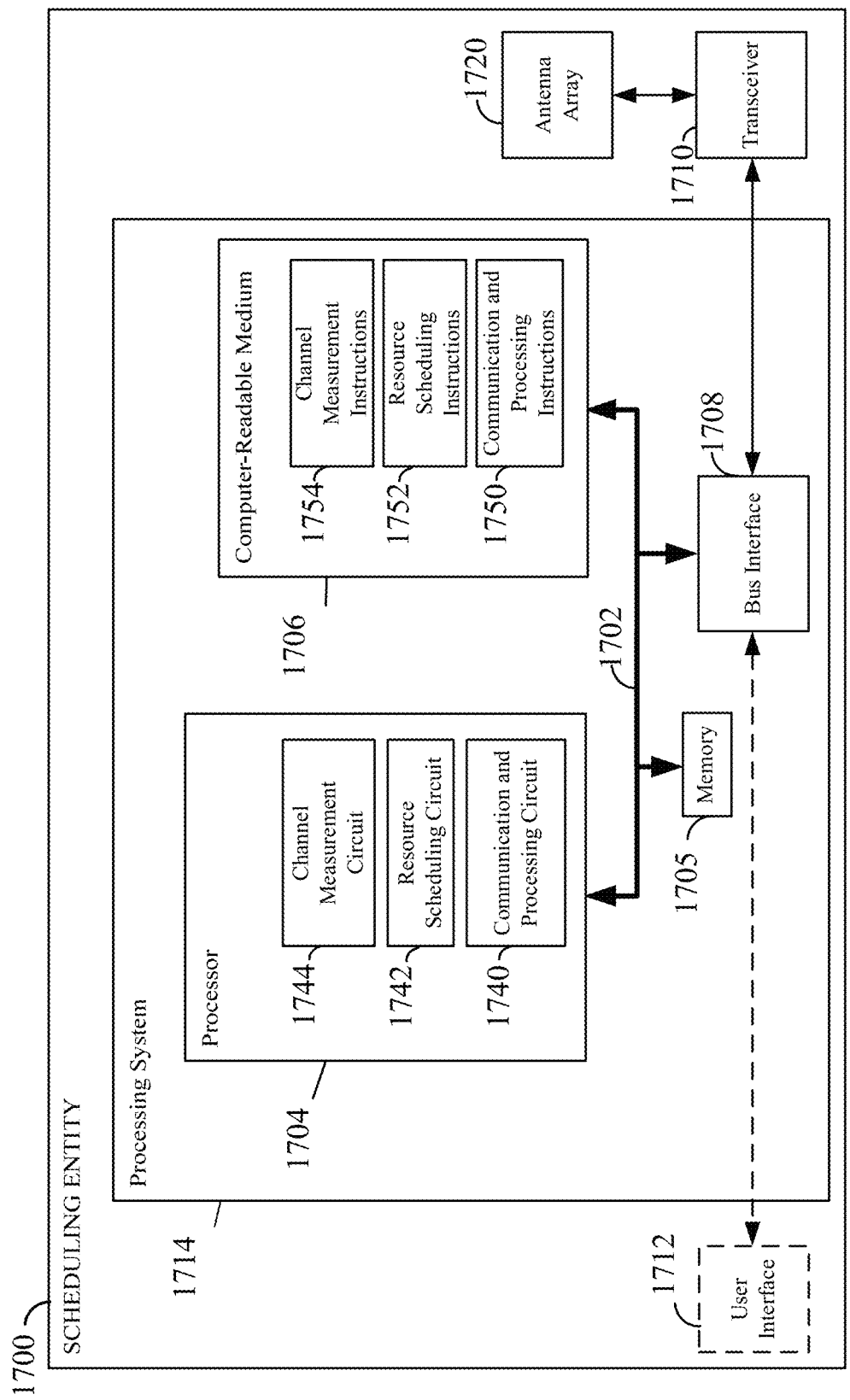
FIG. 17 is a block diagram illustrating an example of a hardware implementation for a scheduling entity according to some aspects of the disclosure.

FIG. 17 is a block diagram illustrating an example of a hardware implementation for a scheduling entity 1700 employing a processing system 1714. For example, the scheduling entity 1700 may be a base station or gNB as illustrated in any one or more of FIGS. 1, 2, and/or 4.

The scheduling entity 1700 may be implemented with a processing system 1714 that includes one or more processors 1704. Examples of processors 1704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1700 may be configured to perform any one or more of the functions described herein. That is, the processor 1704, as utilized in a scheduling entity 1700, may be used to implement any one or more of the processes and procedures described herein and illustrated, for example, in FIGS. 5-16 and 18.

The processor 1704 may in some instances be implemented via a baseband or modem chip and in other implementations, the processor 1704 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1714 may be implemented with a bus architecture, represented generally by the bus 1702. The bus 1702 may include any number of interconnecting buses and bridges depending on the specific application of the processing system 1714 and the overall design constraints. The bus 1702 communicatively couples together various circuits including one or more processors (represented generally by the processor 1704), a memory 1705, and computer-readable media (represented generally by the computer-readable medium 1706). The bus 1702 may also link various other circuits such as timing sources, peripherals, voltage regulators, and power management circuits, which are well known in the art, and therefore, will not be described any further. A bus interface 1708 provides an interface between the bus 1702 and a transceiver 1710. The transceiver 1710 and an antenna array 1720 provide a communication interface or means for communicating with various other apparatus over a transmission medium. Depending upon the nature of the apparatus, a user interface 1712 (e.g., keypad, display, speaker, microphone, joystick) may also be provided. Of course, such a user interface 1712 is optional, and may be omitted in some examples, such as a base station.

The processor 1704 is responsible for managing the bus 1702 and general processing, including the execution of software stored on the computer-readable medium 1706. The software, when executed by the processor 1704, causes the processing system 1714 to perform the various functions described below for any particular apparatus. The computer-readable medium 1706 and the memory 1705 may also be used for storing data that is manipulated by the processor 1704 when executing software.

One or more processors 1704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1706. The computer-readable medium 1706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1706 may reside in the processing system 1714, external to the processing system 1714, or distributed across multiple entities including the processing system 1714. The computer-readable medium 1706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1704 may include circuitry configured for various functions, including, for example, channel measurements and reporting using periodic SPS resources. For example, the circuitry may be configured to implement one or more of the functions described in relation to FIGS. 5-16 and 18.

In some aspects of the disclosure, the processor 1704 may include communication and processing circuitry 1740 configured for various functions, including for example communicating with a network core (e.g., a 5G core network), scheduled entities (e.g., UE), or any other entity, such as, for example, local infrastructure or an entity communicating with the scheduling entity 1700 via the Internet, such as a network provider. In some examples, the communication and processing circuitry 1740 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1740 may include one or more transmit/receive chains. In addition, the communication and processing circuitry 1740 may be configured to receive and process uplink traffic and uplink control messages (e.g., similar to uplink traffic 116 and uplink control 118 of FIG. 1), transmit and process downlink traffic and downlink control messages (e.g., similar to downlink traffic 112 and downlink control 114). The communication and processing circuitry 1740 may further be configured to execute communication and processing software 1750 stored on the computer-readable medium 1706 to implement one or more functions described herein.

In some implementations where the communication involves receiving information, the communication and processing circuitry 1740 may obtain information from a component of the wireless communication device 1700 (e.g., from the transceiver 1710 that receives the information via radio frequency signaling or some other type of signaling suitable for the applicable communication medium), process (e.g., decode) the information, and output the processed information. For example, the communication and processing circuitry 1740 may output the information to another component of the processor 1704, to the memory 1705, or to the bus interface 1708. In some examples, the communication and processing circuitry 1740 may receive one or more of signals, messages, other information, or any combination thereof. In some examples, the communication and processing circuitry 1740 may receive information via one or more channels. In some examples, the communication and processing circuitry 1740 may include functionality for a means for receiving. In some examples, the communication and processing circuitry 1740 may include functionality for a means for processing, including a means for demodulating, a means for decoding, etc.

In some implementations where the communication involves sending (e.g., transmitting) information, the communication and processing circuitry 1740 may obtain information (e.g., from another component of the processor 1704, the memory 1705, or the bus interface 1708), process (e.g., modulate, encode, etc.) the information, and output the processed information. For example, the communication and processing circuitry 1740 may output the information to the transceiver 1710 (e.g., that transmits the information via radio frequency signaling or some other type of signaling suitable for the applicable communication medium). In some examples, the communication and processing circuitry 1740 may send one or more of signals, messages, other information, or any combination thereof. In some examples, the communication and processing circuitry 1740 may send information via one or more channels. In some examples, the communication and processing circuitry 1740 may include functionality for a means for sending (e.g., a means for transmitting). In some examples, the communication and processing circuitry 1740 may include functionality for a means for generating, including a means for modulating, a means for encoding, etc.

In one aspect, the processor 1704 includes a resource scheduling circuitry 1742 that can be configured to perform various functions used in allocating communication resources (e.g., time, frequency, and spatial resources) for wireless communication. For example, the resource scheduling circuitry 1742 can allocate resources using dynamic scheduling and semi-persistent scheduling (SPS). In dynamic scheduling, each uplink/downlink data communication (e.g., PUSCH or PDSCH) can be scheduled and controlled by a DCI. In SPS, one or more uplink/downlink SPS occasions (e.g., PDSCH, PUSCH, and PUCCH occasions) can be configured by a semi-static message (e.g., RRC message) and activated/deactivated/reactivated, for example, using dynamic signaling (e.g., DCI). In one aspect, the resource scheduling circuitry 1742 can allocate both uplink/downlink data resources (e.g., PDSCH/PUSCH resources), channel/interference measurement resources (e.g., DMRS, CSI-RS, and CSI-IM resources), and PUCCH resources in an SPS configuration as described above in relation to FIGS. 5-16. The resource scheduling circuitry 1742 may further be configured to execute resource scheduling software 1752 stored on the computer-readable medium 1706 to implement one or more functions described herein.

In one aspect, the processor 1704 includes a channel measurement circuitry 1744 that can be configured to control various channel and interference measurement functions using SPS resources. The channel measurement circuitry 1744 can perform functions that trigger a UE to measure a channel between the scheduling entity and the UE and transmit a channel report of the channel. For example, the channel measurement circuitry 1744 can determine a DCI or DMRS to be transmitted to the UE for triggering channel and/or interference measurements using SPS resources. The channel measurement circuitry 1744 may further be configured to execute channel measurement software 1754 stored on the computer-readable medium 1706 to implement one or more functions described herein.

Figure 18:
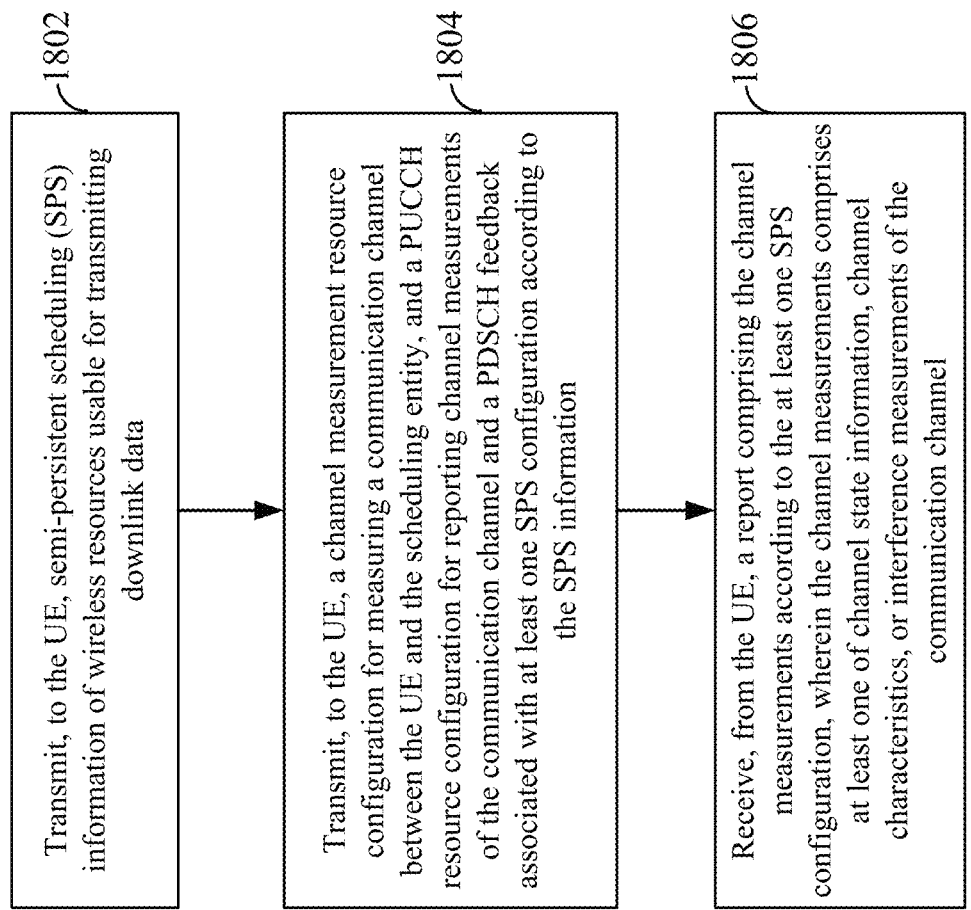
FIG. 18 is a flow chart illustrating an exemplary process for channel measurements at a scheduling entity using SPS resources according to some aspects.

FIG. 18 is a flow chart illustrating an exemplary process 1800 for channel measurements using SPS and periodic resources according to some aspects. As described below, some or all illustrated features may be omitted in a particular implementation within the scope of the present disclosure, and some illustrated features may not be required for all implementations. In some examples, the process 1800 may be carried out by the scheduling entity 1700 illustrated in FIG. 17. In some examples, the process 1800 may be carried out by any suitable apparatus or means for carrying out the functions or algorithm described below.

At block 1802, the scheduling entity can transmit semi-persistent scheduling (SPS) information of wireless resources to a UE. The wireless resources are usable for transmitting downlink data, for example, on an SPS occasion (e.g., PDSCH occasion).

In one aspect, the resource scheduling circuitry 1742 may provide a means to determine the SPS information that configures at least one SPS configuration to allocate downlink data resources (e.g., PDSCH), channel measurement resources (e.g., CSI-RS, DMRS), and/or interference measurement resources (e.g., CSI-IM, empty PDSCH symbols) according to the at least one SPS configuration. The communication and processing circuitry 1740 can provide a means to transmit the SPS information to the UE using the transceiver 1710 and the antenna array 1720. In one example, the scheduling entity can transmit the SPS information using an RRC message or MAC CE.

At block 1804, the scheduling entity can transmit a channel measurement resource configuration to the UE for measuring a communication channel between the UE and the scheduling entity. The scheduling entity can further transmit a PUCCH resource configuration to the UE for reporting channel measurements of the communication channel and a PDSCH feedback associated with at least one SPS configuration according to the SPS information. In some aspects, the scheduling entity can send one or more channel measurement resource configurations to the UE. In one aspect, the scheduling entity can configure aperiodic, periodic, and semi-periodic wireless resources (e.g., time, frequency, and spatial resources) for measuring a communication channel between the UE and the scheduling entity. In one aspect, the communication and processing circuitry 1740 may provide a means to transmit the channel measurement resource configuration to the UE via the transceiver 1710 and antenna array 1720. In one aspect, the resource scheduling circuitry 1742 may provide a means to determine and provide the channel measurement resource configuration.

In one aspect, the scheduling entity may transmit the SPS information and/or channel measurement resource configuration or in one or more DCIs. In one example, a DCI can activate, deactivate, or reactivate one or more SPS configurations that configure the wireless resources for transmitting data using the downlink data resources (e.g., PDSCH) and/or reference signals (e.g., DMRS or CSI-RS) for channel measurements, or providing CSI-IM/empty PDSCH for facilitating interference measurements by the UE. The wireless resources are usable by the UE in the configured SPS occasion(s) for at least one of receiving the downlink data and/or performing channel/interference measurements according to a periodicity and a report timing parameter (e.g., parameter K1 or Z in FIG. 5) defined in the at least one SPS configuration.

At block 1806, the scheduling entity can receive a report (e.g., a channel report) from the UE. The report includes channel measurements according to the at least one SPS configuration. In one aspect, the communication and processing circuitry 1740 may provide a means to receive the report from the UE via the transceiver 1710 and antenna array 1720. The report may include channel state information, channel measurements/characteristic, and/or interference measurements of the channel between the scheduling entity and the UE. In one example, the scheduling entity may receive the report in a UCI of a PUCCH occasion scheduled by the at least one SPS configuration. In one example, the report may include channel measurements, for example, CQI, RI, DMRS-based RSRP, and channel characteristics (e.g., channel delay spread, channel doppler spread, etc.). In one example, the report may include interference measurements, for example, an interference pattern in time and/or frequency, interference power, interference covariance matrix eigenvalues, a ratio between eigenvalues of the interference covariance matrix, an interference covariance matrix, and an interference covariance matrix rank. In some aspects, the report may include a wideband or a single band report.

In one aspect, the scheduling entity can transmit control information that include a DCI that includes an index for activating the at least one SPS configuration among a plurality of SPS configurations. In one aspect, the at least one SPS configuration can include a first SPS configuration configuring resources for downlink data (e.g., PDSCH) and a second SPS configuration configuring resources (e.g., DMRS, CSI-RS, and/or CSI-IM resources) for channel measurements of the communication channel. In some examples, the DCI can further include a flag that can indicate, select, or activate the first SPS configuration or the second SPS configuration as configured by the control information (e.g., DCI). In one aspect, the DCI can include a bitmap configured to indicate a cyclic pattern of a plurality of SPS occasions, including at least one first SPS occasion for the downlink data and at least one second SPS occasion for the channel measurements. In one aspect, the at least one SPS configuration can configure a plurality of SPS occasions with a first periodicity, and the scheduling entity can receive the report at the first periodicity or a second periodicity that is different from the first periodicity. In one aspect, the scheduling entity can transmit one or more reference signals in one or more of the plurality of SPS occasions for measuring the communication channel. For example, the one or more reference signals can include at least one of a DMRS or CSI-RS.

In one aspect, the scheduling entity can transmit a DCI to trigger the channel measurements in at least one SPS occasion defined in the at least one SPS configuration. In one aspect, the scheduling entity can be configured to transmit a first DMRS in a first SPS occasion defined in the at least one SPS configuration, and a second DMRS in a second SPS occasion defined in the at least one SPS configuration. The first DMRS and the second DMRS are distinct from each other, and the second DMRS (special DMRS), rather than the first DMRS, triggers the UE to report the channel measurements. In one aspect, the scheduling entity can receive a plurality of reports respectively in a plurality of PUCCH occasions in response to a single instance of DMRS. In one aspect, the scheduling entity can transmit a special DCI that triggers the UE to report the channel measurements. In one aspect, the scheduling entity can receive a plurality of reports respectively in a plurality of PUCCH occasions in response to a single instance of the DCI. In some aspects, the number of sequential occasions for which a channel report is received by the scheduling entity may be configured by transmitting either an RRC signal or a MAC CE defining a number of the plurality of channel reports.

In the above examples, the circuitry included in the processor 1704 is merely provided as an example, and other means for carrying out the described functions may be included within various aspects of the present disclosure, including but not limited to the instructions stored in the computer-readable storage medium 1706, or any other suitable apparatus or means described in any one of the FIGS. 1, 2, and/or 4, and utilizing, for example, the processes and/or algorithms described herein in relation to FIGS. 5-16 and 18.

Figure 19:
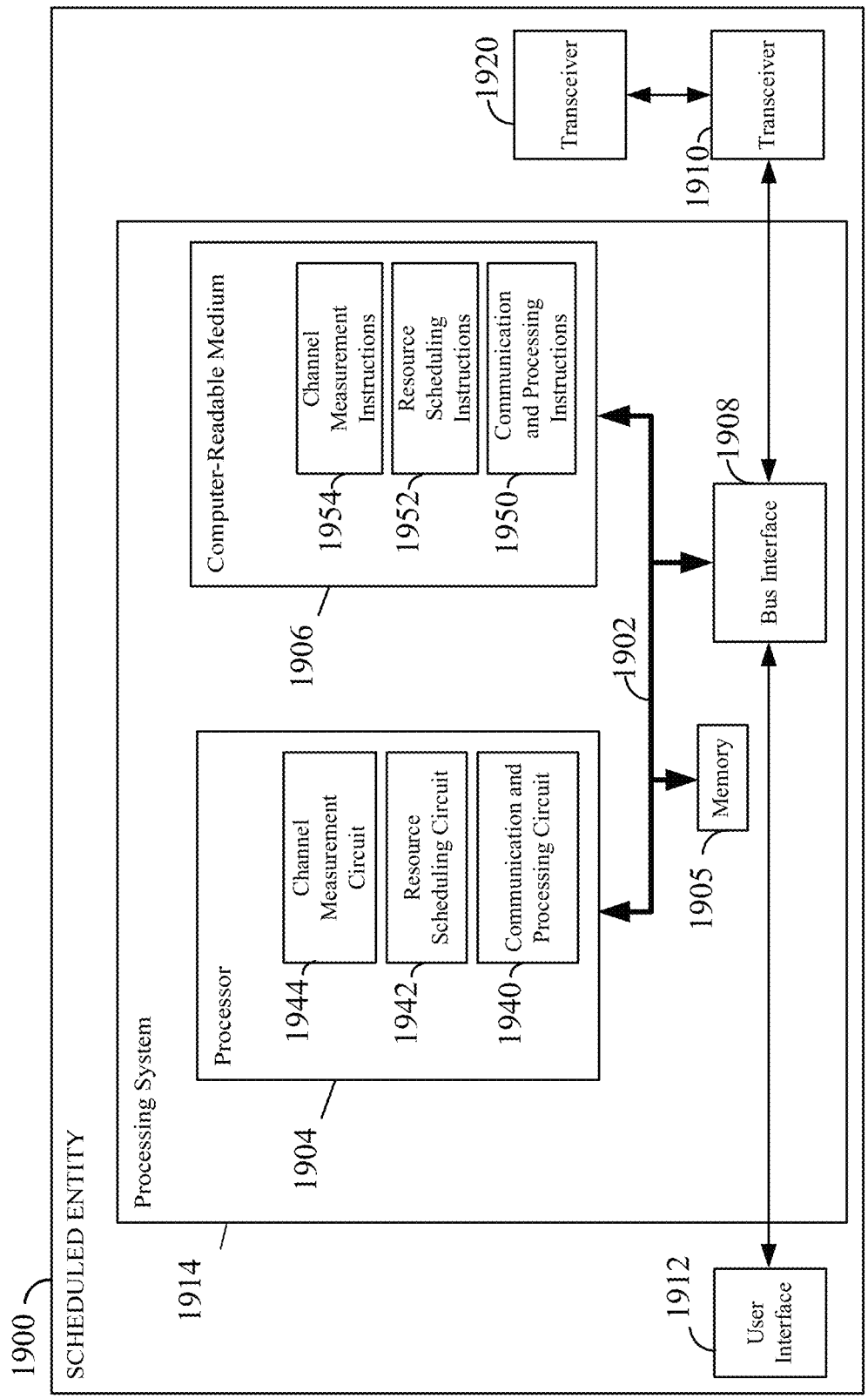
FIG. 19 is a block diagram illustrating an example of a hardware implementation for a scheduled entity according to some aspects of the disclosure.

FIG. 19 is a conceptual diagram illustrating an example of a hardware implementation for an exemplary scheduled entity 1900 employing a processing system 1914. In accordance with various aspects of the disclosure, an element, or any portion of an element, or any combination of elements may be implemented with a processing system 1914 that includes one or more processors 1904. For example, the scheduled entity 1900 may be a user equipment (UE) as illustrated in any one or more of FIGS. 1,2, and/or 4.

The processing system 1914 may be substantially the same as the processing system 1714 illustrated in FIG. 17, including a bus interface 1908, a bus 1902, memory 1905, a processor 1904, and a computer-readable medium 1906. Furthermore, the scheduled entity 1900 may include a user interface 1912, a transceiver 1910, and antenna arrays 1920 substantially similar to those described above in FIG. 17. That is, the processor 1904, as utilized in a scheduled entity 1900, may be used to implement any one or more of the processes described and illustrated in relation to FIGS. 5-16 and 20.

In some aspects of the disclosure, the processor 1904 may include circuitry configured for various functions, including, for example, channel and interference measurements using periodic SPS resources. For example, the circuitry may be configured to implement one or more of the functions described in relation to FIGS. 5-16 and 20.

In some aspects of the disclosure, the processor 1904 may include communication and processing circuitry 1940 configured for various functions, including for example communicating with the scheduling entity 1700. In some examples, the communication and processing circuitry 1940 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1940 may include one or more transmit/receive chains. In addition, the communication and processing circuitry 1940 may be configured to transmit and process uplink traffic and uplink control messages (e.g., similar to uplink traffic 116 and uplink control 118 of FIG. 1), receive and process downlink traffic and downlink control messages (e.g., similar to downlink traffic 112 and downlink control 114). The communication and processing circuitry 1940 may further be configured to execute communication and processing software 1950 stored on the computer-readable medium 1906 to implement one or more functions described herein.

In some implementations where the communication involves receiving information, the communication and processing circuitry 1940 may obtain information from a component of the scheduled entity 1900 (e.g., from the transceiver 1910 that receives the information via radio frequency signaling or some other type of signaling suitable for the applicable communication medium), process (e.g., decode) the information, and output the processed information. For example, the communication and processing circuitry 1940 may output the information to another component of the processor 1904, to the memory 1905, or to the bus interface 1908. In some examples, the communication and processing circuitry 1940 may receive one or more of signals, messages, other information, or any combination thereof. In some examples, the communication and processing circuitry 1940 may receive information via one or more channels. In some examples, the communication and processing circuitry 1940 may include functionality for a means for receiving. In some examples, the communication and processing circuitry 1940 may include functionality for a means for processing, including a means for demodulating, a means for decoding, etc.

In some implementations where the communication involves sending (e.g., transmitting) information, the communication and processing circuitry 1940 may obtain information (e.g., from another component of the processor 1904, the memory 1905, or the bus interface 1908), process (e.g., modulate, encode, etc.) the information, and output the processed information. For example, the communication and processing circuitry 1940 may output the information to the transceiver 1910 (e.g., that transmits the information via radio frequency signaling or some other type of signaling suitable for the applicable communication medium). In some examples, the communication and processing circuitry 1940 may send one or more of signals, messages, other information, or any combination thereof. In some examples, the communication and processing circuitry 1940 may send information via one or more channels. In some examples, the communication and processing circuitry 1940 may include functionality for a means for sending (e.g., a means for transmitting). In some examples, the communication and processing circuitry 1940 may include functionality for a means for generating, including a means for modulating, a means for encoding, etc.

In one aspect, the processor 1904 includes resource scheduling circuitry 1942 that can be configured to perform various functions used in selecting and choosing communication resources (e.g., resources time, frequency, and spatial resources) for wireless communication. For example, the resource scheduling circuitry 1942 can determine the resources based on dynamic signaling (e.g., DCI, MAC CE) and SPS information (RRC messages) received from a scheduling entity (e.g., base station or gNB). In one aspect, the resource scheduling circuitry 1942 can determine resource allocations for both uplink/downlink data in SPS occasions (e.g., PUSCH/PDSCH resources, channel/interference measurement in SPS occasions (e.g., DMRS, CSI-RS, CSI-IM resources), and PUCCH resources based on an SPS configuration received from the scheduling entity. The resource scheduling circuitry 1942 may further be configured to execute resource scheduling software 1952 stored on the computer-readable medium 1906 to implement one or more functions described herein.

In one aspect, the processor 1904 includes channel measurement circuitry 1944 that can be configured to perform various channel and interference measurement functions used in wireless communication. For example, the channel measurement circuitry 1944 can be configured to measure CQI, RI, RSRP, channel delay spread, channel doppler spread, etc. of a channel. The channel measurement circuitry 1944 can also be configured to measure an interference pattern in time or frequency, eigenvalues of an interference covariance matrix, an interference covariance matrix, a ratio between eigenvalues, a rank of an interference covariance matrix, an interference power, or an interference signal mean/average. The channel measurement circuitry 1944 may further be configured to execute channel measurement software 1954 stored on the computer-readable medium 1906 to implement one or more functions described herein.

Figure 20:
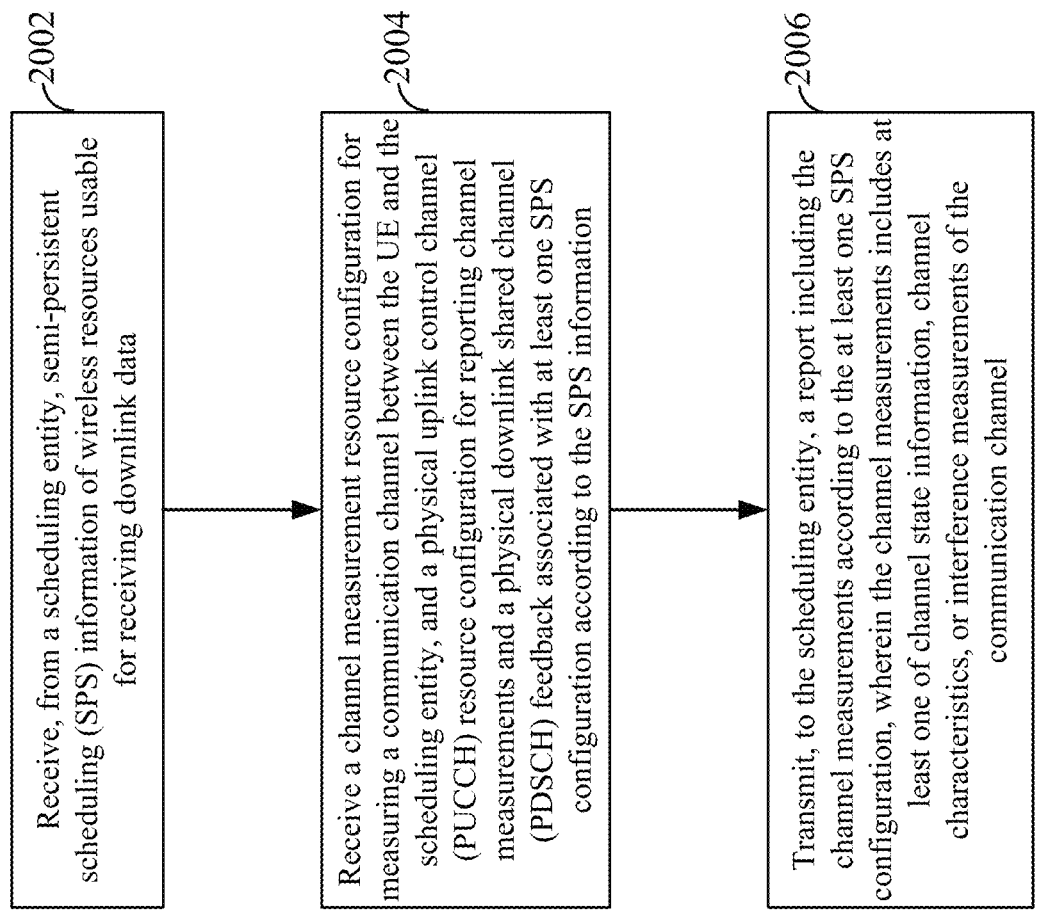
FIG. 20 is a flow chart illustrating an exemplary process for channel measurements at a scheduled entity using SPS resources according to some aspects.

FIG. 20 is a flow chart illustrating an exemplary process 2000 for channel measurements using SPS and periodic resources according to some aspects. As described below, some or all illustrated features may be omitted in a particular implementation within the scope of the present disclosure, and some illustrated features may not be required for all implementations. In some examples, the process 2000 may be carried out by a UE that can be implemented by the scheduled entity 1900 illustrated in FIG. 19. In some examples, the process 2000 may be carried out by any suitable apparatus or means for carrying out the functions or algorithm described below.

At block 2002, a UE can receive semi-persistent scheduling (SPS) information of periodic wireless resources usable for receiving downlink data. In one aspect, the communication and processing circuitry 1940 can provide a means to receive the SPS information via the transceiver 1910 and antenna array 1920. In some aspects, the SPS information may include at least one SPS configuration similar to the SPS configurations described above in relation to FIGS. 5-16. In some aspects, based on the SPS configuration, the UE can determine one or more SPS occasions that can be used for receiving DL data (e.g., PDSCH) and/or performing channel/interference measurements and one or more PUCCH occasions for transmitting a channel report as described above in relation to FIGS. 5-16. In one aspect, the resource scheduling circuitry 1942 can provide a means for determining the SPS occasions and PUCCH occasions based on the SPS information.

At block 2004, the UE can receive a channel measurement resource configuration for measuring a communication channel between the UE and the scheduling entity, and a physical uplink control channel (PUCCH) resource configuration for reporting channel measurements and a physical downlink shared channel (PDSCH) feedback associated with at least one SPS configuration according to the SPS information. In some aspects, the UE can receive one or more channel measurement resource configurations. In one aspect, the communication and processing circuitry 1940 can provide a means to receive the channel measurement resource configuration via the transceiver 1910 and antenna array 1920.

In one aspect, the channel resource configuration may be received in one or more DCIs received in a PDCCH from the scheduling entity. The DCI may include one or more fields or flags (e.g., bit fields or bitmap) that can activate, deactivate, or reactivate channel measurements using, for example, one or more SPS configurations or occasions. In one aspect, the resource scheduling circuitry 1942 can provide a means to determine the triggering status (activated, deactivated, or reactivated) of the at least one SPS configuration based on the channel measurement resource configuration (e.g., DCI(s)).

In some aspects, the UE can perform channel measurements of the communication channel according to a periodicity and a report timing parameter defined in the at least one SPS configuration. For example, the SPS configuration may define a plurality of SPS occasions with a periodicity of P and a reporting timing parameter Z for transmitting a reporting of channel measurements. In one aspect, the channel measurement circuitry 1944 may provide the means to perform channel and interference measurements of the communication channel. In some aspects, the UE can perform channel measurements and transmit a channel report in response to receiving a DMRS or a DCI from the scheduling entity in one or more SPS occasions as described above in relation to FIGS. 13-16. Using DMRS/DCI to trigger channel reporting enables the UE to provide frequent and aperiodic channel reports to the scheduling entity. In some aspects, the channel measurement resource configuration can configure the UE to use periodic, aperiodic, and/or semi-persistent resources for channel measurements and include the channel measurements in PUCCH occasions for one or more SPS occasions (e.g., SPS occasion blocks 904 in FIG. 9).

At block 2006, the UE can transmit a report to the scheduling entity (e.g., gNB). The report includes the channel measurements according to the at least one SPS configuration. In some examples, the channel measurements include at least one of channel state information, channel characteristics, or interference measurements of the communication channel. In one aspect, the communication and processing circuitry 1940 can provide a means to transmit the report via the transceiver 1910 and antenna array 1920. In one example, the UE can transmit UCI including the report in a PUCCH occasion scheduled by the at least one SPS configuration. In one aspect, the resource scheduling circuitry 1942 can provide a means to determine the PUCCH occasion based on the SPS configuration and/or control information (e.g., DCI). In one aspect, the report may include channel and/or interference measurements of the communication channel. The channel and/or interference measurements may include measurements of channel characteristics (e.g., CQI, RI, PMI, and DMRS/CSI-RS based RSRP) and interference measurements of the communication channel. Examples of interference measurements may include interference patterns in time and/or frequency, interference power, interference covariance matrix eigenvalues, a ratio between eigenvalues of the interference covariance matrix, an interference covariance matrix, and an interference covariance matrix rank.

In one aspect, the control information can include a DCI that includes an index for activating the at least one SPS configuration among a plurality of SPS configurations. In one aspect, the at least one SPS configuration can include a first SPS configuration configuring SPS resources for downlink data (e.g., PDSCH) and a second SPS configuration configuring SPS resources (e.g., DMRS, CSI-RS, and/or CSI-IM resources) for the channel measurements of the communication channel. The DCI can further include a flag that can indicate, select, or activate the first SPS configuration or the second SPS configuration as configured by the control information. In one aspect, the DCI can include a bitmap configured to indicate a cyclic pattern of a plurality of SPS occasions including at least one first SPS occasion for the downlink data and at least one second SPS occasion for the channel measurements. In one aspect, the at least one SPS configuration can configure a plurality of SPS occasions with a first periodicity, and the UE can transmit the report at the first periodicity or a second periodicity that is different from the first periodicity. In one aspect, the UE can receive one or more reference signals in one or more of the plurality of SPS occasions for measuring the communication channel. For example, the one or more reference signals include at least one of a DMRS or CSI-RS.

In one aspect, the UE can receive a DMRS in at least one SPS occasion defined in the at least one SPS configuration, and the DMRS can trigger the channel measurements. In one aspect, the UE can receive a DCI that triggers the channel measurements in at least one SPS occasion defined in the at least one SPS configuration. In one aspect, the UE can further receive a first DMRS in a first SPS occasion defined in the at least one SPS configuration, and a second DMRS in a second SPS occasion defined in the at least one SPS configuration. The first DMRS and the second DMRS are distinct from each other, and only the second DMRS, rather than the first DMRS, triggers the UE to report the channel measurements. In one aspect, the UE can transmit a plurality of reports respectively in a plurality of PUCCH occasions in response to a single instance of the DMRS. In one aspect, the UE can receive a first DCI and a second DCI, where the first DCI and the second DCI are distinct from each other, and the second DCI, rather than the first DCI, triggers the UE to report the channel measurements. In one aspect, the UE can transmit a plurality of reports (e.g., channel and/or interference measurements) respectively in a plurality of PUCCH occasions in response to a single instance of the DCI.

Of course, in the above examples, the circuitry included in the processor 1904 is merely provided as an example, and other means for carrying out the described functions may be included within various aspects of the present disclosure, including but not limited to the instructions stored in the computer-readable storage medium 1906, or any other suitable apparatus or means described in any one of the FIGS. 1,2, and/or 4, and utilizing, for example, the processes and/or algorithms described herein in relation to FIGS. 5-16 and 20.

Figure 21:
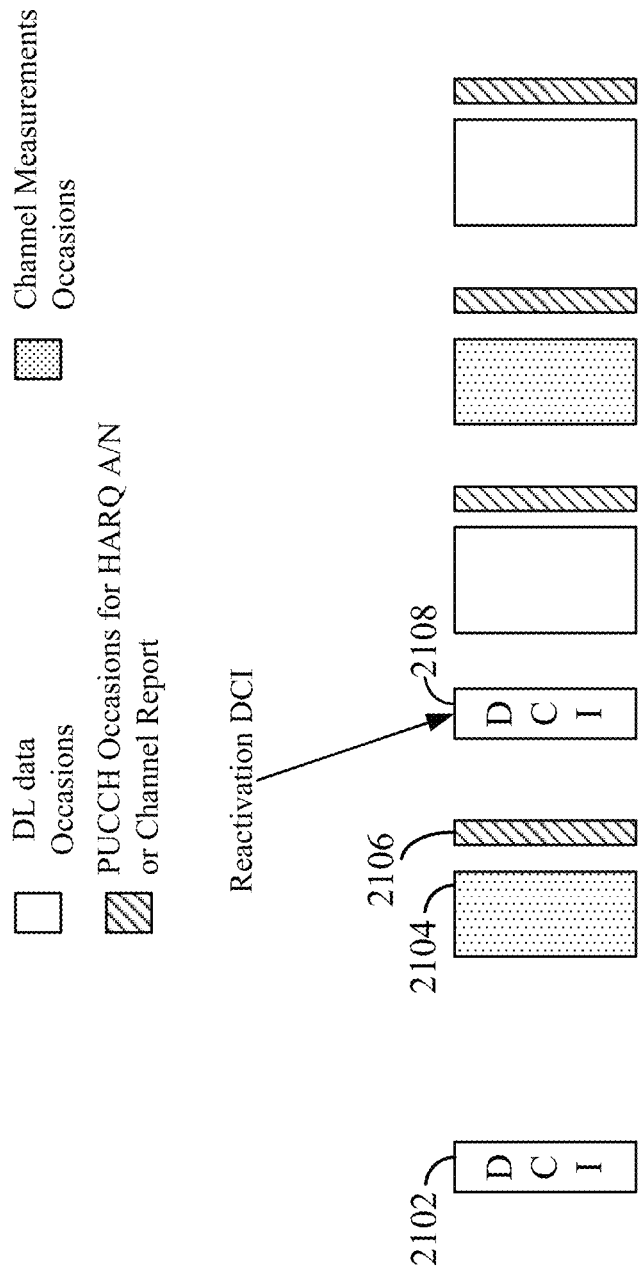
FIGS. 21 and 22 are diagrams illustrating some use cases of the above-described SPS techniques according to some aspects.
Figure 22:
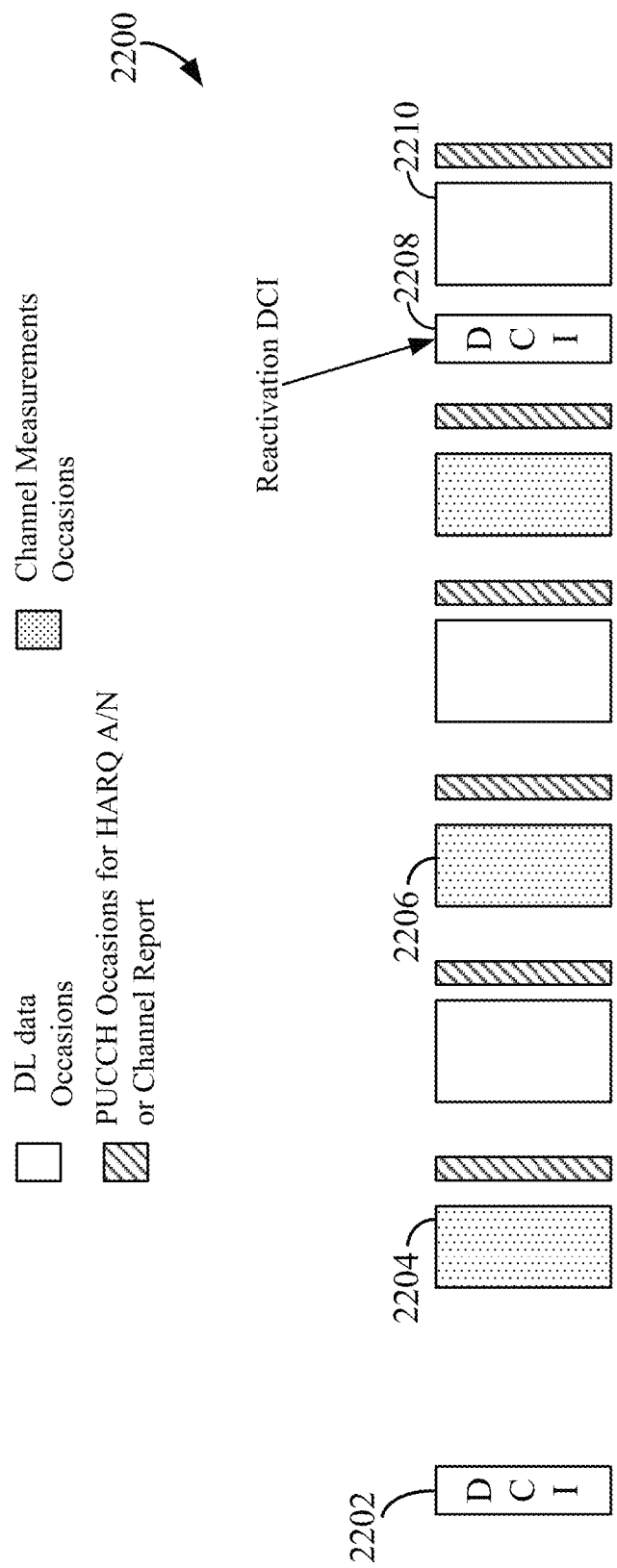

FIGS. 21 and 22 are diagrams illustrating some use cases of the above-described SPS techniques according to some aspects. Referring to FIG. 21, a scheduling entity can transmit a DCI 2102 to activate one or more SPS configurations. A UE can use a first SPS occasion 2104 for channel/interference measurement and report the measurements in a first PUCCH occasion 2106. Based on the measurements, the scheduling entity may determine to change some transmission parameters, for example, MCS, resource allocation, DMRS pattern/configuration, beamforming, precoders, etc. To that end, the scheduling entity can transmit an SPS reactivation DCI 2108 to change or update the transmission parameters for the upcoming SPS occasions.

In FIG. 22, a scheduling entity can transmit a DCI 2202 to trigger one or more SPS configurations. A UE can use a first SPS occasion 2204 and a second SPS occasion 2206 for channel/interference measurements. Based on the reports from these measurements, the scheduling entity can monitor the channel and predict and determine transmission parameters for future SPS occasions. For example, the scheduling entity can transmit an SPS reactivation DCI 2208 to change or update the transmission parameters for the upcoming SPS occasion 2210. The scheduling entity can also use the channel/interference measurements to reconfigure the retransmission parameters (e.g., resource allocation, MCS, DMRS pattern, precoders, etc.) for a failed PDSCH downlink data transmission.

Several aspects of a wireless communication network have been presented with reference to an exemplary implementation. As those skilled in the art will readily appreciate, various aspects described throughout this disclosure may be extended to other telecommunication systems, network architectures and communication standards.

A first aspect of the disclosure provides a scheduling entity for wireless communication, the scheduling entity comprising: a communication interface configured to communicate with a user equipment (UE); a memory; and a processor coupled with the communication interface and the memory, wherein the processor and the memory are configured to: transmit, to the UE, semi-persistent scheduling (SPS) information of wireless resources usable for transmitting downlink data; transmit, to the UE, a channel measurement resource configuration for measuring a communication channel between the UE and the scheduling entity, and a physical uplink control channel (PUCCH) resource configuration for reporting channel measurements of the communication channel and a physical downlink shared channel (PDSCH) feedback associated with at least one SPS configuration according to the SPS information; and receive, from the UE, a report comprising the channel measurements according to the at least one SPS configuration, wherein the channel measurements comprises at least one of channel state information, channel characteristics, or interference measurements of the communication channel.

In a second aspect, alone or in combination with the first aspect, wherein the channel measurements comprise channel measurements based on at least one of: a periodic, an aperiodic, or a semi-persistent downlink reference signal; or an interference measurement resource of the channel.

In a third aspect, alone or in combination with any of the first to second aspects, wherein the PUCCH resource configuration comprises resources for the PDSCH feedback associated with the at least one SPS configuration and resources for channel measurements.

In a fourth aspect, alone or in combination with any of the first to second aspects, wherein the report comprises: a first report comprising the PDSCH feedback for one or more PDSCH occasions of the at least one SPS configuration; and a second report comprising the channel measurements for one or more channel measurement occasions of the at least one SPS configuration.

In a fifth aspect, alone or in combination with the first aspects, wherein the PDSCH feedback comprises a plurality of hybrid automatic repeat request (HARQ) feedback bits associated with the one or more PDSCH occasions; and the channel measurements comprise a plurality of channel state information (CSI) bits associated with the one or more channel measurement occasions.

In a sixth aspect, alone or in combination with any of the first to second aspects, wherein the processor and the memory are further configured to: transmit, to the UE, downlink control information (DCI) that includes an index for activating the at least one SPS configuration among a plurality of SPS configurations.

In a seventh aspect, alone or in combination with the first aspect, wherein the at least one SPS configuration comprises a first SPS configuration configuring resources for downlink data and a second SPS configuration configuring resources for the channel measurements of the communication channel, and wherein the DCI further comprises a flag configured to select the first SPS configuration or the second SPS configuration activated by the index.

In an eighth aspect, alone or in combination with any of the first to second aspects, wherein the processor and the memory are further configured to: transmit, to the UE, downlink control information (DCI) that includes a bitmap configured to indicate a cyclic pattern of a plurality of SPS occasions comprising at least one first SPS occasion configured for the downlink data and at least one second SPS occasion configured for the channel measurements.

In a ninth aspect, alone or in combination with any of the first to second aspects, wherein the at least one SPS configuration configures a plurality of SPS occasions with a first periodicity, and wherein the processor and the memory are further configured to receive the report at the first periodicity or a second periodicity that is different from the first periodicity.

In a tenth aspect, alone or in combination with the ninth aspect, wherein the processor and the memory are further configured to: transmit one or more reference signals in one or more of the plurality of SPS occasions for measuring the communication channel, wherein the one or more reference signals comprise at least one of: a demodulation reference signal (DMRS); or a channel-state information reference signal (CSI-RS).

In an eleventh aspect, alone or in combination with any of the first to second aspects, wherein the processor and the memory are further configured to, at least one of: transmit a demodulation reference signal (DMRS) in at least one SPS occasion defined in the at least one SPS configuration, the DMRS configured to trigger the channel measurements; or transmit downlink control information (DCI), the DCI configured to trigger the channel measurements in at least one SPS occasion defined in the at least one SPS configuration.

In a twelfth aspect, alone or in combination with the eleventh aspect, wherein the processor and the memory are further configured to transmit the DMRS, comprising: a first DMRS in a first SPS occasion defined in the at least one SPS configuration; and a second DMRS in a second SPS occasion defined in the at least one SPS configuration, wherein the first DMRS and the second DMRS are distinct from each other, and the second DMRS, rather than the first DMRS, triggers the UE to report the channel measurements.

In a thirteenth aspect, alone or in combination with the eleventh aspect, wherein the processor and the memory are further configured to receive the report, comprising: receiving a plurality of reports respectively in a plurality of physical uplink control channel (PUCCH) occasions in response to a single instance of the DMRS or a single instance of the DCI.

In a fourteenth aspect, alone or in combination with the eleventh aspect, wherein the DCI comprises a first DCI and a second DCI, where the first DCI and the second DCI are distinct from each other, and the second DCI, rather than the first DCI, triggers the UE to report the channel measurements.

A fifth aspect provides a method of wireless communication at a scheduling entity, the method comprising: transmitting, to a user equipment (UE), semi-persistent scheduling (SPS) information of wireless resources usable for transmitting downlink data; transmitting, to the UE, a channel measurement resource configuration for measuring a communication channel between the UE and the scheduling entity, and a physical uplink control channel (PUCCH) resource configuration for reporting channel measurements and a physical downlink shared channel (PDSCH) feedback associated with at least one SPS configuration according to the SPS information; and receiving, from the UE, a report comprising the channel measurements according to the at least one SPS configuration, wherein the channel measurements comprises at least one of channel state information, channel characteristics or interference measurements of the communication channel.

A sixteenth aspect provides a user equipment (UE) for wireless communication, the UE comprising: a communication interface configured to communicate with a scheduling entity; a memory; and a processor coupled with the communication interface and the memory, wherein the processor and the memory are configured to: receive, from a scheduling entity, semi-persistent scheduling (SPS) information of wireless resources usable for receiving downlink data; receive, from the scheduling entity, a channel measurement resource configuration for measuring a communication channel between the UE and the scheduling entity, and a physical uplink control channel (PUCCH) resource configuration for reporting channel measurements of the communication channel and a physical downlink shared channel (PDSCH) feedback associated with at least one SPS configuration according to the SPS information; and transmit, to the scheduling entity, a report comprising the channel measurements according to the at least one SPS configuration, wherein the channel measurements comprise at least one of channel state information, channel characteristics, or interference measurements of the communication channel.

In a seventeenth aspect, alone or in combination with the sixteenth aspect, wherein the channel measurements comprise channel measurements based on at least one of: a periodic, an aperiodic, or a semi-persistent downlink reference signal; or an interference measurement resource of the channel.

In an eighteenth aspect, alone or in combination with any of the sixteenth to seventeenth aspects, wherein the PUCCH resource configuration comprises resources for PDSCH feedback associated with the at least one SPS configuration and resources for channel measurements.

In a nineteenth aspect, alone or in combination with any of the sixteenth to seventeenth aspects, wherein report comprises: a first report comprising the PDSCH feedback for one or more PDSCH occasions of the at least one SPS configuration; and a second report comprising the channel measurements for one or more channel measurement occasion of the at least one SPS configuration.

In a twentieth aspect, alone or in combination with the nineteenth aspect, wherein the PDSCH feedback comprises a plurality of hybrid automatic repeat request (HARQ) feedback bits associated with the one or more PDSCH occasions; and the channel measurements comprise a plurality of channel state information (CSI) bits associated with the one or more channel measurement occasions.

In a twenty-first aspect, alone or in combination with any of the sixteenth to seventeenth aspects, wherein the processor and the memory are further configured to: receive downlink control information (DCI) that includes an index for activating the at least one SPS configuration among a plurality of SPS configurations.

In a twenty-second aspect, alone or in combination with the twenty-first aspect, wherein the at least one SPS configuration comprises a first SPS configuration configuring resources for downlink data and a second SPS configuration configuring resources for the channel measurements of the communication channel, and wherein the DCI further comprises a flag configured to select the first SPS configuration or the second SPS configuration activated by the index.

In a twenty-third aspect, alone or in combination with any of the sixteenth to seventeenth aspects, wherein the processor and the memory are further configured to: receive downlink control information (DCI) that includes a bitmap configured to indicate a cyclic pattern of a plurality of SPS occasions comprising at least one first SPS occasion configured for the downlink data and at least one second SPS occasion configured for the channel measurements.

In a twenty-fourth aspect, alone or in combination with any of the sixteenth to seventeenth aspects, wherein the at least one SPS configuration configures a plurality of SPS occasions with a first periodicity, and wherein the processor and the memory are further configured to transmit the report at the first periodicity or a second periodicity that is different from the first periodicity.

In a twenty-fifth aspect, alone or in combination with the twenty-fourth aspect, wherein the processor and the memory are further configured to: receive one or more reference signals in one or more of the plurality of SPS occasions for measuring the communication channel, wherein the one or more reference signals comprise at least one of: a demodulation reference signal (DMRS); or a channel-state information reference signal (CSI-RS).

In a twenty-sixth aspect, alone or in combination with any of the sixteenth to seventeenth aspects, the processor and the memory are further configured to, at least one of: receive a demodulation reference signal (DMRS) in at least one SPS occasion defined in the at least one SPS configuration, the DMRS configured to trigger the channel measurements; or receive downlink control information (DCI), the DCI configured to trigger the channel measurements in at least one SPS occasion defined in the at least one SPS configuration.

In a twenty-seventh aspect, alone or in combination with the twenty-sixth aspect, wherein the processor and the memory are further configured to the receive the DMRS, comprising: receiving a first DMRS in a first SPS occasion defined in the at least one SPS configuration; and receiving a second DMRS in a second SPS occasion defined in the at least one SPS configuration, wherein the first DMRS and the second DMRS are distinct from each other, and the second DMRS, rather than the first DMRS, triggers the UE to report the channel measurements.

In a twenty-eighth aspect, alone or in combination with the twenty-sixth aspect, wherein the processor and the memory are further configured to the transmit the report, comprising: transmitting a plurality of reports respectively in a plurality of physical uplink control channel (PUCCH) occasions in response to a single instance of the DMRS or a single instance of the DCI.

In a twenty-ninth aspect, alone or in combination with the twenty-sixth aspect, wherein the DCI comprises a first DCI and a second DCI, where the first DCI and the second DCI are distinct from each other, and the second DCI, rather than the first DCI, triggers the UE to report the channel measurements.

A thirtieth aspect provides a method of wireless communication at a user equipment (UE), the method comprising: receiving, from a scheduling entity, semi-persistent scheduling (SPS) information of wireless resources usable for receiving downlink data; receiving, from the scheduling entity, a channel measurement resource configuration for measuring a communication channel between the UE and the scheduling entity, and a physical uplink control channel (PUCCH) resource configuration for reporting channel measurements and a physical downlink shared channel (PDSCH) feedback associated with at least one SPS configuration according to the SPS information; and transmitting, to the scheduling entity, a report comprising the channel measurements according to the at least one SPS configuration, wherein the channel measurements comprise at least one of channel station information, channel characteristics, or interference measurements of the communication channel.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-22 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-22 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A scheduling entity for wireless communication, comprising:
    a memory; and
    one or more processors coupled with the memory, the one or more processors being configured to:
    transmit, to the UE, semi-persistent scheduling (SPS) information of wireless resources usable for transmitting downlink data, the SPS information comprising:
       a first SPS configuration that allocates physical downlink shared channel (PDSCH) resources; and
       a second SPS configuration that allocates at least one of channel measurement resources or interference measurement resources;
    transmit, to the UE, a channel measurement resource configuration for measuring a communication channel between the UE and the scheduling entity, and a physical uplink control channel (PUCCH) resource configuration for reporting channel measurements of the communication channel and a PDSCH feedback associated with the first SPS configuration; and
    receive, from the UE, a report comprising the channel measurements according to the second SPS configuration, wherein the channel measurements comprises at least one of channel state information, channel characteristics, or interference measurements of the communication channel.

2. The scheduling entity of claim 1, wherein the channel measurements comprise channel measurements based on at least one of:
    a periodic, an aperiodic, or a semi-persistent downlink reference signal; or
    an interference measurement resource of the channel.

3. The scheduling entity of claim 2, wherein the PUCCH resource configuration comprises resources for the PDSCH feedback associated with the first SPS configuration and resources for channel measurements, according to the SPS information.

4. The scheduling entity of claim 1, wherein the report comprises:
a first report comprising the PDSCH feedback for one or more PDSCH occasions of the first SPS configuration; and
a second report comprising the channel measurements for one or more channel measurement occasions of the second SPS configuration.

5. The scheduling entity of claim 4, wherein the PDSCH feedback comprises a plurality of hybrid automatic repeat request (HARD) feedback bits associated with the one or more PDSCH occasions; and the channel measurements comprise a plurality of channel state information (CSI) bits associated with the one or more channel measurement occasions.

6. The scheduling entity of claim 1, wherein the one or more processors are further configured to:
transmit, to the UE, downlink control information (DCI) that includes an index for activating at least one of the first SPS configuration or the second SPS configuration.

7. The scheduling entity of claim 6,
wherein the DCI further comprises a flag configured to select the first SPS configuration or the second SPS configuration activated by the index.

8. The scheduling entity of claim 1, wherein the one or more processors are further configured to:
transmit, to the UE, downlink control information (DCI) that includes a bitmap configured to indicate a cyclic pattern of a plurality of SPS occasions comprising at least one first SPS occasion configured for the downlink data and at least one second SPS occasion configured for the channel measurements.

9. The scheduling entity of claim 1,
wherein the first SPS configuration configures a plurality of first SPS occasions with a first periodicity, and
wherein the second SPS configuration configures a plurality of second SPS occasions with a second periodicity that is different from the first periodicity.

10. The scheduling entity of claim 9, wherein the one or more processors are further configured to:
transmit one or more reference signals in one or more of the plurality of second SPS occasions for measuring the communication channel, wherein the one or more reference signals comprise at least one of:
a demodulation reference signal (DMRS); or
a channel-state information reference signal (CSI-RS).

11. The scheduling entity of claim 1, wherein the one or more processors are further configured to, at least one of:
transmit a demodulation reference signal (DMRS) in at least one SPS occasion defined in the second SPS configuration, the DMRS configured to trigger the channel measurements; or
transmit downlink control information (DCI), the DCI configured to trigger the channel measurements in at least one SPS occasion defined in the second SPS configuration.

12. The scheduling entity of claim 11, wherein the one or more processors are further configured to transmit the DMRS, comprising:
a first DMRS in a first SPS occasion defined in the second SPS configuration; and
a second DMRS in a second SPS occasion defined in the second SPS configuration,
wherein the first DMRS and the second DMRS are distinct from each other, and the second DMRS, rather than the first DMRS, triggers the UE to report the channel measurements.

13. The scheduling entity of claim 11, wherein the one or more processors are further configured to receive the report, comprising:
receiving a plurality of reports respectively in a plurality of physical uplink control channel (PUCCH) occasions in response to a single instance of the DMRS or a single instance of the DCI.

14. The scheduling entity of claim 11, wherein the DCI comprises a first DCI and a second DCI, where the first DCI and the second DCI are distinct from each other, and the second DCI, rather than the first DCI, triggers the UE to report the channel measurements.

15. A method of wireless communication at a scheduling entity, comprising:
transmitting, to a user equipment (UE), semi-persistent scheduling (SPS) information of wireless resources usable for transmitting downlink data, the SPS information comprising:
a first SPS configuration that allocates physical downlink shared channel (PDSCH) resources; and
a second SPS configuration that allocates at least one of channel measurement resources or interference measurement resources;
transmitting, to the UE, a channel measurement resource configuration for measuring a communication channel between the UE and the scheduling entity, and a physical uplink control channel (PUCCH) resource configuration for reporting channel measurements and a PDSCH feedback associated with the first SPS configuration; and
receiving, from the UE, a report comprising the channel measurements according to the second SPS configuration, wherein the channel measurements comprises at least one of channel state information, channel characteristics or interference measurements of the communication channel.

16. A user equipment (UE) for wireless communication, comprising:
a communication interface configured to communicate with a scheduling entity;
a memory; and
one or more processors coupled with the communication interface and the memory, are the one or more processors being configured to:
receive, from a scheduling entity, semi-persistent scheduling (SPS) information of wireless resources usable for receiving downlink data, the SPS information comprising:
a first SPS configuration that allocates physical downlink shared channel resources; and
a second SPS configuration that allocates at least one of channel measurement resources or interference measurement resources;
receive, from the scheduling entity, a channel measurement resource configuration for measuring a communication channel between the UE and the scheduling entity, and a PUCCH resource configuration for reporting channel measurements of the communication channel and a physical downlink shared channel (PDSCH) feedback associated with the first SPS configuration; and
transmit, to the scheduling entity, a report comprising the channel measurements according to the second SPS configuration, wherein the channel measurements comprise at least one of channel state information, channel characteristics, or interference measurements of the communication channel.

17. The UE of claim 16, wherein the channel measurements comprise channel measurements based on at least one of:
a periodic, an aperiodic, or a semi-persistent downlink reference signal; or
an interference measurement resource of the channel.

18. The UE of claim 17, wherein the PUCCH resource configuration comprises resources for the PDSCH feedback associated with the first SPS configuration and resources for channel measurements, according to the SPS information.

19. The UE of claim 16, wherein report comprises:
a first report comprising the PDSCH feedback for one or more PDSCH occasions of the first SPS configuration; and
a second report comprising the channel measurements for one or more channel measurement occasion of the second SPS configuration.

20. The UE of claim 19, wherein the PDSCH feedback comprises a plurality of hybrid automatic repeat request (HARD) feedback bits associated with the one or more PDSCH occasions; and the channel measurements comprise a plurality of channel state information (CSI) bits associated with the one or more channel measurement occasions.

21. The UE of claim 16, wherein the one or more processors are further configured to:
receive downlink control information (DCI) that includes an index for activating at least one of the first SPS configuration or the second SPS configuration.

22. The UE of claim 21,
wherein the DCI further comprises a flag configured to select the first SPS configuration or the second SPS configuration activated by the index.

23. The UE of claim 16, wherein the one or more processors are further configured to:
receive downlink control information (DCI) that includes a bitmap configured to indicate a cyclic pattern of a plurality of SPS occasions comprising at least one first SPS occasion configured for the downlink data and at least one second SPS occasion configured for the channel measurements.

24. The UE of claim 16,
wherein the first SPS configuration configures a plurality of first SPS occasions with a first periodicity, and
wherein the second SPS configuration configures a plurality of second SPS occasions with a second periodicity that is different from the first periodicity.

25. The UE of claim 24, wherein the one or more processors are further configured to:
receive one or more reference signals in one or more of the plurality of second SPS occasions for measuring the communication channel, wherein the one or more reference signals comprise at least one of:
a demodulation reference signal (DMRS); or
a channel-state information reference signal (CSI-RS).

26. The UE of claim 16, wherein the one or more processors are further configured to, at least one of:
receive a demodulation reference signal (DMRS) in at least one SPS occasion defined in the second SPS configuration, the DMRS configured to trigger the channel measurements; or
receive downlink control information (DCI), the DCI configured to trigger the channel measurements in at least one SPS occasion defined in the second SPS configuration.

27. The UE of claim 26, wherein the one or more processors are further configured to the receive the DMRS, comprising:
receiving a first DMRS in a first SPS occasion defined in the second SPS configuration; and
receiving a second DMRS in a second SPS occasion defined in the second SPS configuration,
wherein the first DMRS and the second DMRS are distinct from each other, and the second DMRS, rather than the first DMRS, triggers the UE to report the channel measurements.

28. The UE of claim 26, wherein the one or more processors are further configured to the transmit the report, comprising:
transmitting a plurality of reports respectively in a plurality of physical uplink control channel (PUCCH) occasions in response to a single instance of the DMRS or a single instance of the DCI.

29. The UE of claim 26, wherein the DCI comprises a first DCI and a second DCI, where the first DCI and the second DCI are distinct from each other, and the second DCI, rather than the first DCI, triggers the UE to report the channel measurements.

30. A method of wireless communication at a user equipment (UE), comprising:
receiving, from a scheduling entity, semi-persistent scheduling (SPS) information of wireless resources usable for receiving downlink data, the SPS information comprising:
a first SPS configuration that allocates physical downlink shared channel resources; and
a second SPS configuration that allocates at least one of channel measurement resources or interference measurement resources;
receiving, from the scheduling entity, a channel measurement resource configuration for measuring a communication channel between the UE and the scheduling entity, and a PUCCH resource configuration for reporting channel measurements and a physical downlink shared channel (PDSCH) feedback associated with at least one SPS configuration according to the SPS information; and
transmitting, to the scheduling entity, a report comprising the channel measurements according to the at least one SPS configuration, wherein the channel measurements comprise at least one of channel station information, channel characteristics, or interference measurements of the communication channel.

* * * * *